(12) United States Patent
Yang et al.

(10) Patent No.: US 8,964,720 B2
(45) Date of Patent: Feb. 24, 2015

(54) MIMO OFDMA AND PREAMBLE DESIGN

(75) Inventors: Hong-Kui Yang, San Diego, CA (US); Shu Wang, San Diego, CA (US)

(73) Assignee: VIA Telecom Co., Ltd., George Town (KY)

( * ) Notice: Subject to any disclaimer, the term of this patent is extended or adjusted under 35 U.S.C. 154(b) by 751 days.

(21) Appl. No.: 12/793,383

(22) Filed: Jun. 3, 2010

(65) Prior Publication Data

US 2010/0309868 A1 Dec. 9, 2010

Related U.S. Application Data

(60) Provisional application No. 61/183,555, filed on Jun. 3, 2009.

(51) Int. Cl.
| | |
|---|---|
| *H04J 11/00* | (2006.01) |
| *H04L 27/26* | (2006.01) |
| *H04W 72/12* | (2009.01) |
| *H04L 5/00* | (2006.01) |

(52) U.S. Cl.
CPC ......... *H04L 27/2602* (2013.01); *H04W 72/121* (2013.01); *H04L 5/0007* (2013.01); *H04L 5/0037* (2013.01)
USPC ............................. 370/348; 370/437; 370/322

(58) Field of Classification Search
USPC ......... 370/203, 208, 310, 321, 322, 326, 347, 370/348, 431, 436, 437, 442, 464, 468, 498, 370/522
See application file for complete search history.

(56) References Cited

U.S. PATENT DOCUMENTS

| | | | | |
|---|---|---|---|---|
| 6,842,440 | B2 * | 1/2005 | Paneth et al. ................ | 370/330 |
| 6,917,603 | B2 * | 7/2005 | Strawczynski et al. ....... | 370/336 |
| 7,813,260 | B2 * | 10/2010 | Wang et al. .................. | 370/203 |
| 2007/0086371 | A1 * | 4/2007 | Makhijani et al. ........... | 370/328 |
| 2007/0195907 | A1 * | 8/2007 | Wang et al. .................. | 375/267 |
| 2007/0214400 | A1 * | 9/2007 | Smith et al. .................. | 714/748 |
| 2008/0039107 | A1 * | 2/2008 | Ma et al. ...................... | 455/450 |
| 2008/0212702 | A1 * | 9/2008 | Pan et al. ..................... | 375/260 |

* cited by examiner

*Primary Examiner* — Curtis A Alia

(74) *Attorney, Agent, or Firm* — Richard K. Huffman; James W. Huffman

(57) ABSTRACT

A method is provided for coupling a plurality of access nodes wirelessly to a plurality of access terminals. The method includes dividing up a carrier frequency into a plurality of subbands; scheduling one or more access terminals to share one of the plurality of subbands; and via one of the plurality of access nodes, first communicating with the one or more access terminals over the one of the plurality of subbands. The communicating includes, within the one of the plurality of subbands, time division multiplexing interlaces corresponding to each of the one or more access terminals.

24 Claims, 15 Drawing Sheets

DEPLOYMENT OF OFDMA AND OFDM

IMPROVED MUP EFFICIENCY VIA OFDM, SECTORIZATION, AND TDM

MODIFIED SECTORPARAMETER MESSAGE FOR PREDEFINED OFDMA PATTERNS

| FIELD | LENGTH (BITS) |
|---|---|
| MESSAGEID | 8 |
| COUNTRYCODE | 12 |
| SECTORID | 128 |
| SUBNETMASK | 8 |
| SECTORSIGNATURE | 16 |
| LATITUDE | 22 |
| LONGITUDE | 23 |
| ROUTEUPDATERADIUSOVERHEAD | 11 |
| LEAPSECONDS | 8 |
| LOCALTIMEOFFSET | 11 |
| REVERSELINKSILENCEDURATION | 2 |
| REVERSELINKSILENCEPERIOD | 2 |
| CHANNELCOUNT | 5 |

| | |
|---|---|
| OFDMAPATTERNSINCLUDED | 3 |

| | |
|---|---|
| SUPPORTEDOFDMAPATTERNS | 3 |

FIG. 9
MODIFIED SECTORPARAMETER MESSAGE FOR EMBEDDED OFDMA PREAMBLE

| FIELD | LENGTH (BITS) |
|---|---|
| MESSAGEID | 8 |
| COUNTRYCODE | 12 |
| SECTORID | 128 |
| SUBNETMASK | 8 |
| SECTORSIGNATURE | 16 |
| LATITUDE | 22 |
| LONGITUDE | 23 |
| ROUTEUPDATERADIUSOVERHEAD | 11 |
| LEAPSECONDS | 8 |
| LOCALTIMEOFFSET | 11 |
| REVERSELINKSILENCEDURATION | 2 |
| REVERSELINKSILENCEPERIOD | 2 |
| CHANNELCOUNT | 5 |

| | |
|---|---|
| ANCHORSUBBANDPOSITION | 4 |

EXEMPLARY OFDMA SLOT STRUCTURES FOR 2-LEVEL MULTIUSER PREAMBLE

EXEMPLARY OFDMA SLOT STRUCTURE FOR 2-LEVEL PREAMBLE

ALTERNATIVE EXEMPLARY OFDMA SLOT STRUCTURE FOR 2-LEVEL PREAMBLE

INTERFERENCE CANCELLATION

INTERFERENCE CANCELLATION FOR CDM DO

DEPLOYMENT OF MULTIPLE SUBBAND OFDM

SLOT STRUCTURE FOR ENHANCEMENT LAYERING

MIMO OFDMA AND PREAMBLE DESIGN

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
|---|---|---|
| 61183555 (VTU.09-0032-US) | Jun. 03, 2009 | MIMO OFDMA AND PREAMBLE DESIGN |

BACKGROUND OF THE INVENTION

1. Field of the Invention

This invention relates in general to the field of microelectronics, and more particularly to an apparatus and method for improving the data throughput over a cellular network.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service.

And although wireless cellular network technologies have continued to provide improvements related to the ability to process voice calls, there has also been an enormous pull on the industry to provide improvements related to the processing of data as well as voice. It is not uncommon today to find many cell phone users who not only place voice calls over a cellular network, but who also check their email, send text messages, and browse the internet.

Accordingly, a number of technologies are under development to improve the quality and throughput of data. These so-called "3G" or third generation cellular communications technologies are highly optimized for the reliable transfer of packet data instead of voice data. Hence, 3G data protocols such as EDGE® and EV-DO technologies are not generally characterized as modulation techniques, but more so by performance metrics (e.g., 5 Megabits per second throughput). And this is because although a given data connection must be guaranteed some minimal level of latency and throughput, the timing required to transfer data such as a text message pales in comparison to that required to transfer voice information.

The above noted technologies for increasing throughput notwithstanding, the demands for data transfer continue to grow with cell phones now being used to transfer real time data related to audio and video. Consequently, network providers are looking for ways to leverage existing infrastructures while at the same time providing for orders of magnitude in increases in data throughput and user capacity.

Accordingly, the present inventors have noted the inefficiencies associated with the utilization of code division multiple access (CDMA) based data networks such as EDGE® and EV-DO® to process both non-real time data and delay sensitive data such as voice over internet protocol (VoIP) data, as well as other types of data.

Accordingly, what is needed is a technique that enables a CDMA-base cellular data network to process increasing amounts of data while at the same time maximizing the use of existing infrastructure.

In addition, what is needed is an apparatus and method for increasing the capacity of an existing CDMA-based data protocol in order to maximize the data transfer rate.

What is also needed is a mechanism for processing packetized data over a cellular data network that takes advantage of the unused bandwidth of an existing data network, but which also is compatible with legacy cellular devices.

SUMMARY OF THE INVENTION

The present invention, among other applications, is directed to solving the above-noted problems and addresses other problems, disadvantages, and limitations of the prior art. The present invention provides a superior technique for improving the performance of a cellular packetized data network. In one embodiment, a method is provided for coupling a plurality of access nodes wirelessly to a plurality of access terminals, the method comprising: scheduling the plurality of access terminals to share one of a plurality of subbands through the plurality of access nodes; and communicating with the plurality of access terminals according to one of the plurality of subbands, the plurality of subbands comprising a plurality of preambles, said communicating further comprising time division multiplexing interlaces corresponding to each of the plurality of access terminals according to the plurality of subbands and the plurality of preambles.

Another aspect of the present invention contemplates an apparatus wirelessly coupled to a plurality of access terminals, the apparatus comprising: a controller configured to schedule the plurality of access terminals to share one of a plurality of subbands through the plurality of access nodes; and a communicating module coupled to the plurality of access terminals and the controller, the plurality of subbands comprising a plurality of preambles, the communicating module configured to conduct time division multiplexing interlaces corresponding to each of the plurality of access terminals according to the plurality of subbands and the plurality of preambles.

Another aspect of the present invention contemplates a method for an access terminal which is coupled to a plurality of access nodes, the method comprising receiving one of a plurality of subbands which is decided by the plurality of access nodes; and communicating with the plurality of access nodes according to one of the plurality of subbands, the plurality of subbands comprising a plurality of preambles, said communicating further comprising time division multiplexing interlaces according to the plurality of subbands and the plurality of preambles.

Another aspect of the present invention contemplates an apparatus which is coupled to a plurality of access nodes, the apparatus comprising a receiver, configured to receive one of a plurality of subbands which is decided by a plurality of access nodes; and a communicating module coupled to the plurality of access nodes according to one of the plurality of subbands, the plurality of subbands comprising a plurality of preambles, said communicating module further comprising time division multiplexing interlaces according to the plurality of subbands and the plurality of preambles.

BRIEF DESCRIPTION OF THE DRAWINGS

These and other objects, features, and advantages of the present invention will become better understood with regard to the following description, and accompanying drawings where:

FIG. 9 is a block diagram showing a modified SECTORPARAMETER message for embedded OFDMA preamble according to the present invention;

DETAILED DESCRIPTION

Figure 1:
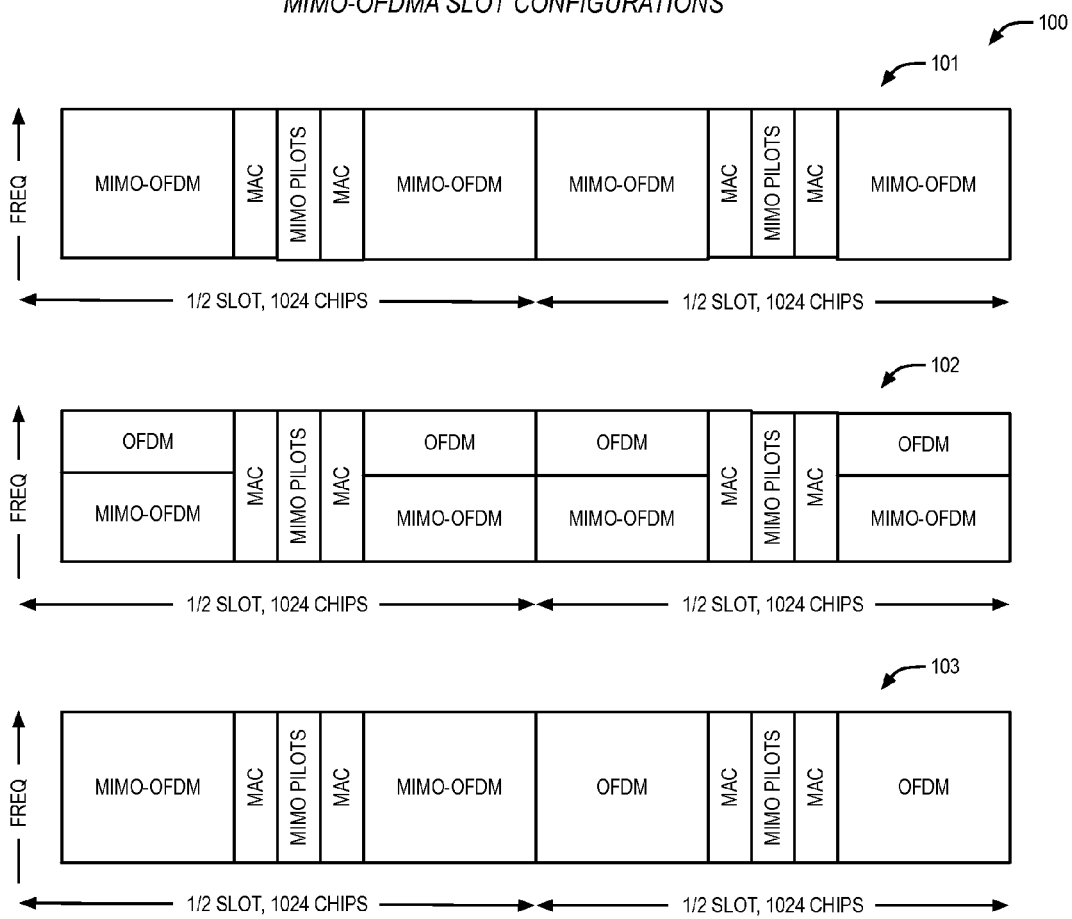
FIG. 1 is a block diagram illustrating exemplary slot structures that employ various configurations of multiple-input multiple-output (MIMO) orthogonal frequency division multiple access (OFDMA) techniques according to the present invention.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on cellular communications systems and associated techniques employed within present day wireless communications systems for the reliable transmission and reception of packetized data, a discussion of the present invention will be presented with reference to FIGS. 1-21. The present invention overcomes the disadvantages of present day systems by providing apparatus and methods that employ both frequency diversity, spatial diversity, and time division multiplexing in order to increase capacity and minimize interference.

It well know that VoIP user capacity according to EV-DO® Revision A protocol is bounded by the rise over thermal (RoT) control in the reverse link. For example, the capacity is 44 VoIP access terminals (ATs) per sector in a default setting and when both reverse link interference control (RL IC) and receive diversity techniques are employed, the capacity limit expands to 66 VoIP ATs per sector. The present inventors note that with the introduction of multiple input, multiple output (MIMO) according to revision C of the EV-DO protocol, new opportunities are presented that allow for further optimization of EV-DO for VoIP applications. Accordingly, the present inventors have developed new MIMO subtypes for the EV-DO protocol for both forward link (FL) and RL applications.

Theoretically, EV-DO revision A VoIP user capacity is upper bounded at 96 users per carrier with an assumption of one 8-AT multiuser packet (MUP) for every VoIP frame. However, in reality, the capacity is upper bounded at 66 ATs per sector. Yet, when one employs a combination of MIMO and orthogonal frequency division multiplexing (OFDM) in subtypes according to EV-DO revision C, VoIP services can be further optimized, as will be disclosed below.

In general, one skilled in the art will appreciate that there is a tradeoff between VoIP user capacity and sector throughput. For instance, a scheduler usually gives VoIP ATs higher priority due to their inherent delay requirement. As a result, best effort (BE) throughput is rapidly reduced as the number of VoIP users increases.

The introduction of closed loop-multiple transmitter diversity (CL-MTD) mechanisms may help to increase DO VoIP user capacity because such mechanisms are known to alleviate the existing RL limitation on VoIP capacity. However, the present inventors postulate that the introduction of FL-MIMO interlacing and subtypes might actually limit DO VoIP user capacity if it is not treated carefully. Consider that a FL MIMO 8-subpack interlace might reduce the scheduling opportunity for up to 16 VoIP ATs.

When one considers MIMO techniques under EV-DO revision C, one skilled in the art will appreciate that achievable capacity of a MIMO channel grows linearly with the minimum of transmit and receive antenna sizes—only in theory. Yet in reality, the achievable spatial multiplexing gain of a 1.2288 Megahertz (MHz) channel depends on both channel scattering and AT antenna array size rather than on geometric limitation (that is, the minimum of either number of transmitters or number of receivers, $\min\{N_{tx}, N_{rx}\}$). In addition, there is an delay and throughput dilemma in FL scheduling because BE throughput is reduced with the increase of VoIP user capacity.

Accordingly, the present inventors have observed that when OFDMA/Multiuser MIMO techniques according to the present invention are employed under EV-DO revision C, significant improvements in VoIP capacity and sector throughput are realized, as will be further discussed below. These techniques include, but are not limited to multiuser spatial multiplexing and a combination of subband OFDMA and MIMO mechanisms.

There are several advantages that the present invention provides when these techniques are employed to optimize VoIP service under EV-DO revision C. For exampled, MUP packing efficiency is improved. In addition, these techniques enable a scheduler to service more VoIP users in fewer packets than would otherwise be achievable. Accordingly, the scalability of FL MIMO is improved.

Also, conflict between MIMO BE ATs and VoIP ATs is avoided and user experience on cell edges is improved. Finally, a trade off between VoIP user capacity and sector throughput is realized.

Turning to FIG. 1, a block diagram 100 is presented illustrating exemplary slot structures 101-103 that employ various configurations of multiple-input multiple-output (MIMO) orthogonal frequency division multiple access (OFDMA) techniques according to the present invention. Slot structure 101 is employed to transmit data that utilizes both MIMO and OFDM techniques over the full 1.2288 Megahertz (MHz) channel. In one embodiment, the channel is divided into four OFDM subbands of 0.3096 MHz each. Hence, the entire slot 101 comprises transmission of data using both MIMO and OFDM.

Slot 102 utilizes one or more of the subbands to transmit pure OFDM data, and the remaining subbands to transmit data using both MIMO and OFDM. Slot 103 shows an alternative approach according to the present invention where data using both MIMO and OFDM is transmitted during the first half of the slot 103 and pure OFDM data is transmitted during the second half of the slot 103.

The present inventors note that EV-DO VoIP user capacity is known to depend on the available schedulable resources and that this capacity is reduced rapidly when more interlaces are reserved or used for other purposes like broadcast and multicast services (BCMCS) or BE. Accordingly, it is a feature of the present invention to balance VoIP user capacity and MIMO traffic by increasing the granularity of MIMO.

Figure 2:
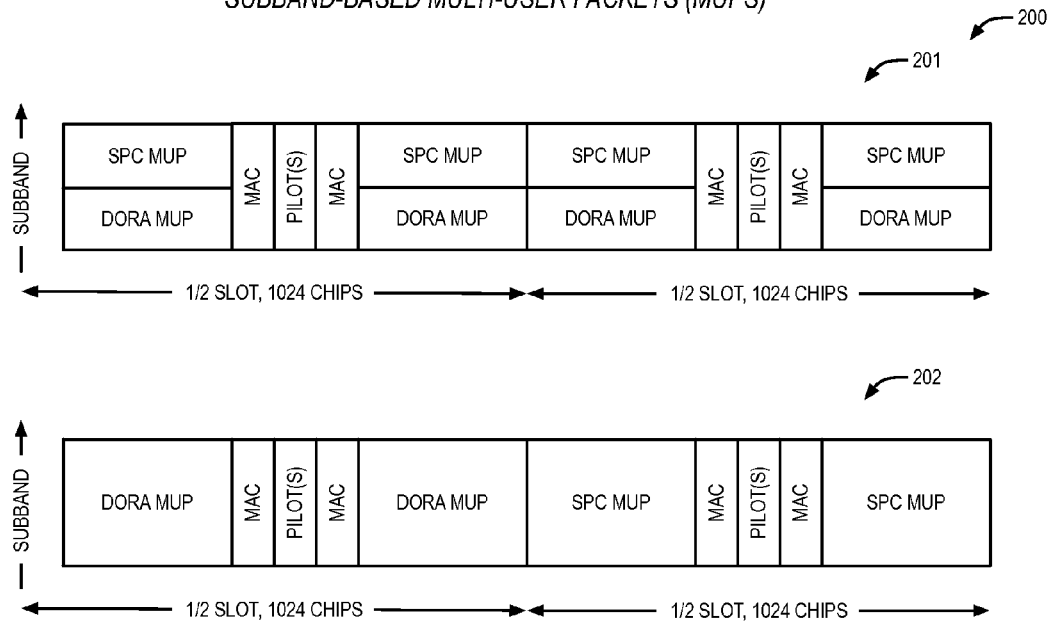
FIG. 2 is a block diagram depicting subband-based multiple user packets (MUPS) according to the present invention.

Referring now to FIG. 2, a block diagram 200 is presented depicting subband-based multiple user packets (MUPs) according to the present invention. The diagram depicts a first multiuser packet 201 that utilizes one or more of the OFDM subbands to transmit a multiuser packet having superposition coding (SPC) and the remaining subbands to transmit a MUP according to EV-DO revision A. Accordingly, the techniques according to the present invention are backwards compatible with legacy protocols. A second MUP slot 202 transmits EV-DO revision A MUPs during a first half-slot and SPC MUPs during a second half of the slot 202.

One aspect of the present contemplates the grouping of VoIP packets into multiple small-sized MUPs of different rates, and then employing frequency division multiplexing (FDM) or time division multiplexing (TDM) for transmission. This aspect of the present invention is shown in FIGS. 3 and 4.

Figure 3:
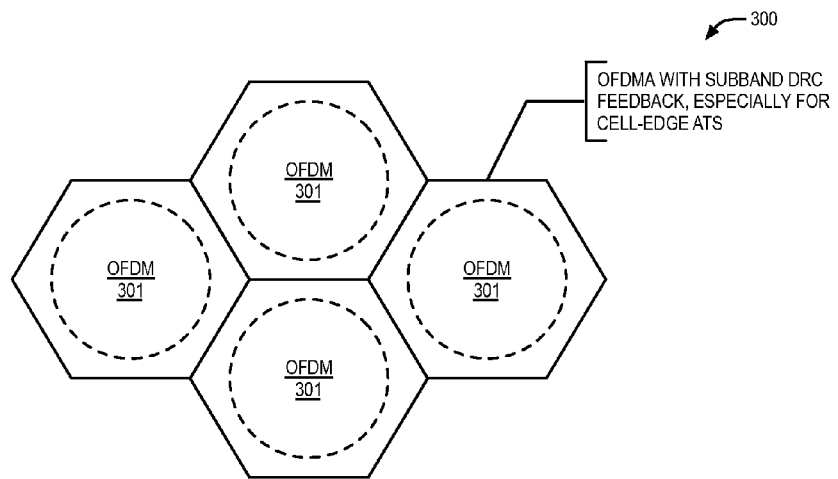
FIG. 3 is a block diagram featuring an exemplary deployment configuration for OFDM and OFDMA according to the present invention.

Now turning to FIG. 3, a block diagram 300 is presented featuring an exemplary deployment configuration for OFDM and OFDMA according to the present invention. The diagram 300 shows a plurality of OFDM cells 301, each providing for subband DRC feedback, especially for cell edge ATs.

As one skilled in the art will appreciate, CDMA2000 1x and EV-DO are well-known to be interference limited, especially on cell edges due to pilot interference, overhead channel interference and traffic channel interference. And it is noted that the present invention provides multiple mechanisms to improve cell-edge performance, which include interference management of power control and frequency reuse. This is achieved by employing OFDMA with power management techniques as discussed above. In addition, cooperation between neighbor ANs provides for macro-diversity through use of simple broadcast multicast. In considering AN cooperation, it is known that soft combine has the advantage of simple receiver design and the potential of 3 dB SNR gain. Additionally, soft combine puts more scheduling constraints on the ANs. Yet, for OFDMA a single traffic pattern is required to be shared between participating ANs.

Figure 4:
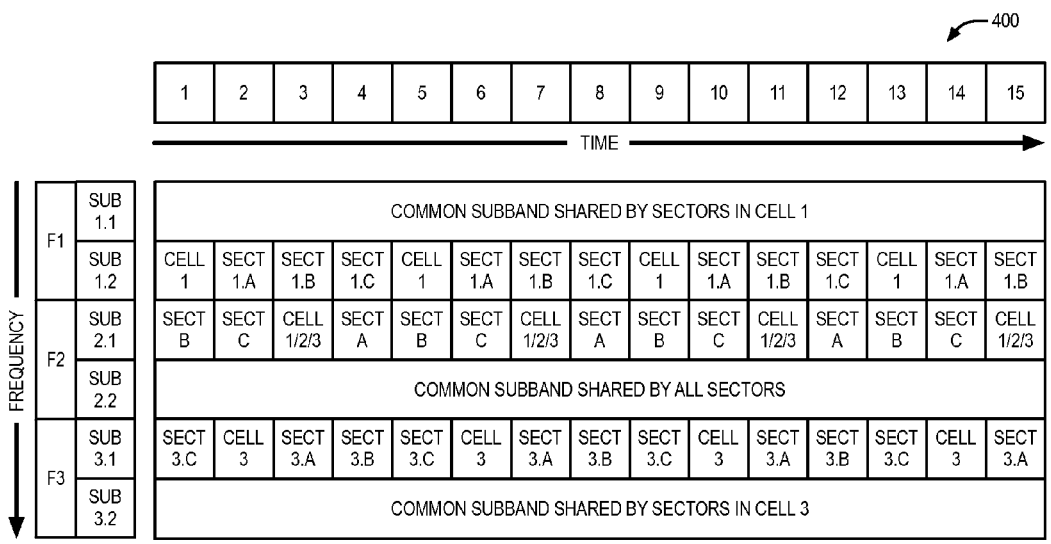
FIG. 4 is a block diagram showing how MUP efficiency is improved via use of OFDM, sectorization, and time division multiplexing (TDM) techniques according to the present invention.

Referring to FIG. 4, a block diagram 400 is presented showing how MUP efficiency is improved via use of OFDM, sectorization, and time division multiplexing (TDM) techniques according to the present invention. The diagram 400 depicts all three techniques as may be applicable to scenarios presenting significant user capacity challenges. Such scenarios include, but are not limited to, stadiums, parks, shopping centers, and other facilities where large numbers of users are present in a small geographic region.

The diagram 400 depicts three different frequencies F1-F3, which are each divided into two OFDMA subbands 1.1-1.2, 2.1-2.2, and 3.1-3.2. In this exemplary transmission, subband 1.1 is employed as a common subband that is shared by all sectors in cell 1. Subband 2.2 is employed as a subband common to all sectors in cells 1-3. And subband 3.2 is a common subband shared by all sectors in cell 3. Hence, frequency F2 is common to all three cells, but F1 and F3 are unique to cells 1 and 3, respectively.

TDM is employed to transmit data directed to ATs in specific sectors A-C as they are served by the ANs in cells 1-3. Thus, a transmission to an AT in cell 1 over subband 1.2 occurs during sub-slots 1, 5, 9, and 13, that is, every fourth sub-slot. In like manner, sector A is served by the AN in cell 1 during sub-slots 2, 6, 10, and 14. Sector C can be served by ANs in cells 1, 2, or 3 during sub-slots 2, 6, 10, and 14 over subband 2.1, and alternate antennas in either of cells 1-3 can transmit during sub-slots 3, 7, 1, and 15. And so on.

The techniques employed for MUPs as described above serve to improve cell edge throughput at the expense of average sector throughput. Interference management can be done in the subband or sub-slot level. Interference avoidance is achievable in time domain (via sub-slots 1-15), frequency domain (via subbands 1.1-1.2, 2.1-2.2, 3.1-3.2), space domain (via sectors A-C) through power allocations. Accordingly, finer granularity in frequency, time, and space according to the present invention provides for higher achievable use efficiencies. Advantageously, less ping-pong occurs during handoffs.

Finer frequency granularity necessarily implies multi-antenna ATs, and the present inventors note that it is non-trivial to squeeze more and more antennas and corresponding radio frequency (RF) apparatus into a mobile phone with when considering power consumption, mechanical limitations (e.g., multiple radio interfaces are present already such as Global Positioning System (GPS), BLUETOOTH®, WiFi, etc.), and antenna spacing requirements. With regard to antenna spacing, one skilled in the art will appreciate that for more spatial diversity gain, antenna separation should be larger than half of the wavelength of the center frequency which, for 2.0 Gigahertz, the wavelength is about 15 centimeters or 5.9 inches. Another factor that affects antenna consideration is operating frequency bands. Yet, on the other hand, the achievable MIMO channel capacity also depends on the scattering statistics in addition to the antenna configuration. The scattering statistics are usually quantified or captured by the angular intervals and the antenna array configuration is characterized by the area or size limitation in the unit of wavelength and the shape.

With an unlimited AT size, the achievable spatial multiplexing gain may still be limited by the spatial scattering condition. For example, in the case of a 4×4 MIMO (i.e., four antennas for transmitting, four antennas for receiving), the typical rank distribution where less than 1% of the users are able to use rank 4. Most users have either rank 1 or 2.

For an AT with the physical size of a few times of wavelength, the achievable spatial multiplexing gain is limited by the angle spread, AT size and carrier-to-interference (C/I) ratio. Thus, the above presents a realistic case for practical multi-antenna mobile devices. Consequently, expected spatial multiplexing gain mostly is less than 3 according to the present invention.

Accordingly, the impact of MIMO on EV-DO VoIP capacity can be minimized through finer MIMO transmission granularity. In one aspect, MIMO transmission can be in the size of a subband and/or a sub-slot instead of the unit of the whole 1.2288 MHz and one slot. The inherent rank deficiency of a MIMO channel can be mitigated through extending EV-DO revision A/B multiuser packeting and adding frequency diversity (i.e., OFDMA-MIMO) and/or multiuser diversity (i.e., (MU-MIMO). The benefits of extending multi-user packet packing include higher sector throughput and more VoIP user capacity. It is noted that a major challenge will be how to minimize the signaling overhead.

Figure 5:
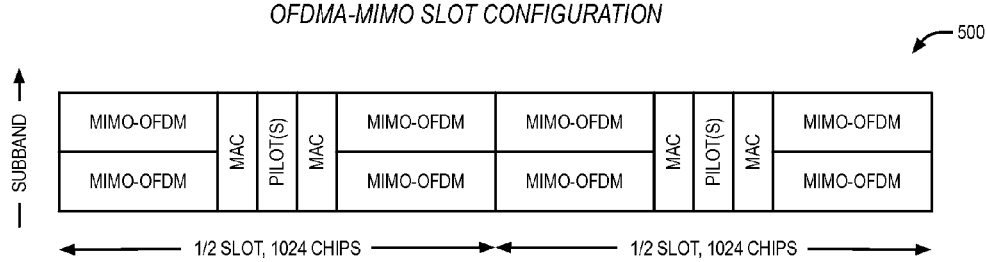
FIG. 5 is a block diagram illustrating an OFDMA-MIMO slot configuration according to the present invention.

Attention is now directed to FIG. 5 where a block diagram is presented illustrating an OFDMA-MIMO slot configuration 500 according to the present invention. Therein, MIMO-OFDM data is transmitted in finer granularity via subbands having finer granularity within a given frequency. According to this approach, receiving antenna selection is an efficient multi-antenna technique to asymptotically achieve the full potentials of MIMO techniques. It requires fewer RF chains, and has less phone design limitation, lower power consumption, and lower manufacturing cost. The achievable spectral efficiency can be close to those ATs with full RF chains when the following techniques are employed:

Antenna Selection: the AT chooses antennas for the next receive and transmit

Beam Selection: the AT selects the best beams and feeds back the preamble message indicators (PMIs)

Subband Selection: the AT calculates PMIs for desired subbands and reports back the best several PMIs to AN.

In addition, each AT reports data rate control (DRC) for desired subband(s). For example, for each single-antenna AT, it reports DRC/PMI for each of the four subbands. And for each dual-antenna AT, it reports two DRC/PMI for each of two subbands. In one embodiment, four bits indicate the data rate request and 3 bits indicate the desired serving sector, and the channel utilizes 64-ary bi-orthogonal modulation. The DRC is sent on the Walsh codes W832 and W2432 and is multiplexed on the in-phase (I) and quadrature (Q) branches, which is similar to the DRC report in multiple code word (MCW) mode.

Figure 6:
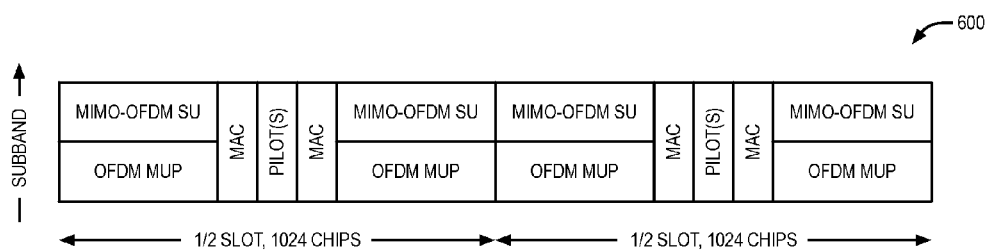
FIG. 6 is a block diagram detailing a multiuser MIMO slot configuration according to the present invention.

Turning to FIG. 6, a block diagram is presented detailing a multiuser MIMO slot configuration 600 according to the present invention. Therein, MIMO-OFDM single user (SU) data is transmitted in a first subband while OFDM MUP data is transmitted in the other subband. According to this approach, Each AT reports DRCs/PMIs for the desired subband(s). For each single-antenna AT, it reports DRC/PMI for each of the four subbands. For each dual-antenna AT, it reports two DRC/PMI for each of two subbands. The AN accomplishes MIMO spatial multiplexing based on the PMI feedbacks from multiple ATs. As an option, transmitted DRCs/PMIs may be broadcast through an FL preamble.

Regarding subband OFDMA multiuser interlace, there is a tradeoff between control overhead and achievable performance in terms of throughput and delay. Though only one media access control identification (MAC-ID) preamble is enough to signal the AT(s) to be served at either high throughput or low delay, it is hard to balance in between. For better support of both high-data rate AT/services and delay-sensitive ATs/services, it may be necessary for AN to serve multiple ATs in one interlace. And OFDMA is a mechanism for efficiently multiplexing more than one ATs in a single interlace. Consequently, a flexible preamble design is necessary to accommodate the dynamic nature of multiuser scheduling.

Figure 7:
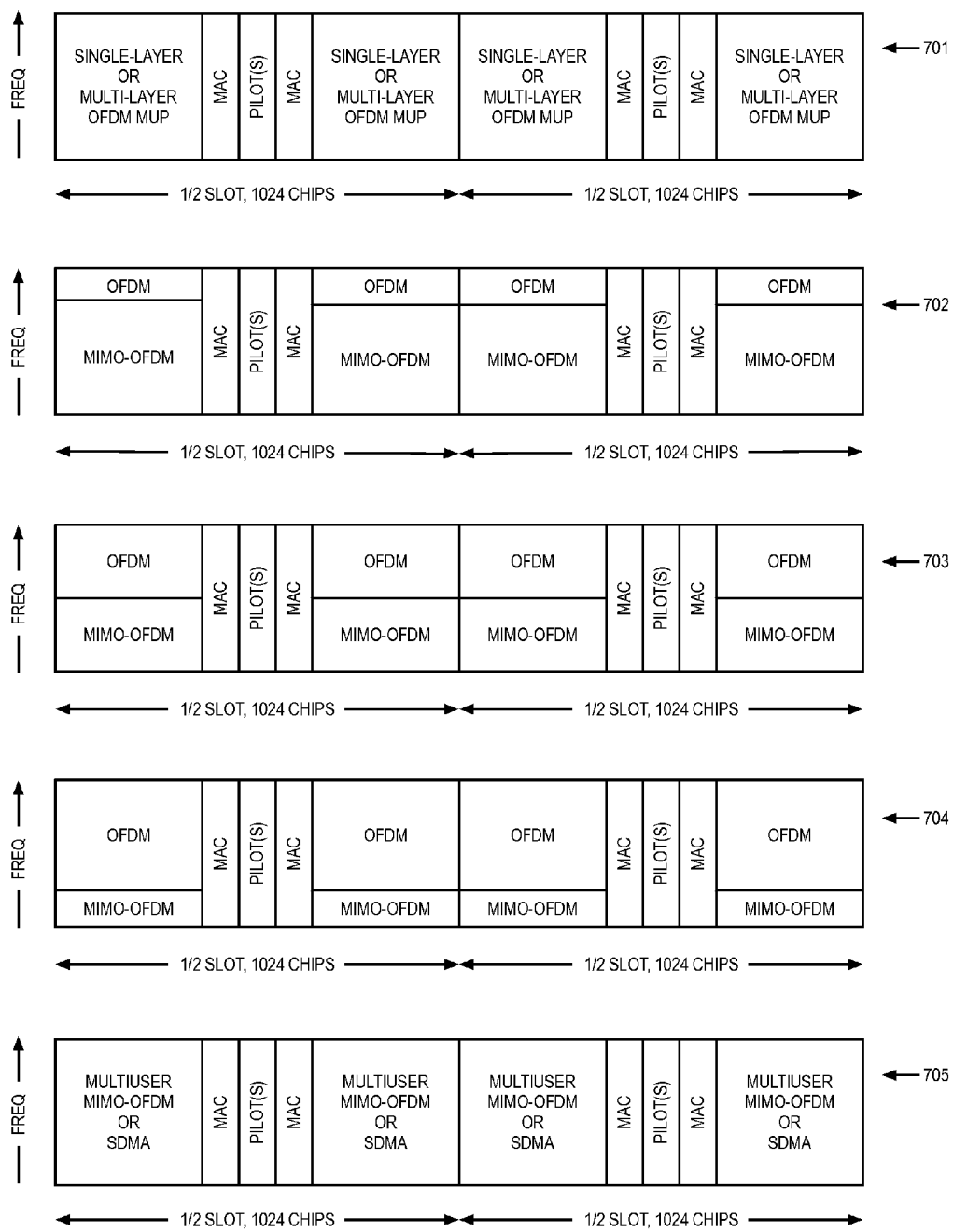
FIG. 7 is a block diagram illustrating subband OFDMA pattern examples according to the present invention.

Now turning to FIG. 7, a block diagram 700 is presented illustrating subband OFDMA pattern examples 701-705 according to the present invention. Pattern 701 depicts single-layer or multi-layer OFDM MUP data transmitted in a slot across the available subbands. Pattern 702 depicts OFDM data being transmitted in one of the subbands and MIMO-OFDM data being transmitted in the remaining subbands. Pattern 703 depicts OFDM data being transmitted in two of four subbands and MIMO-OFDM data transmitted in the remaining two subbands. Pattern 704 depicts OFDM data being transmitted in three of four subbands and MIMO-OFDM data transmitted in the remaining subband. And pattern 705 shows multiuser MIMO-OFDM or special demand multiple access (SDMA) data transmitted in all four of the subbands.

As alluded to above, accommodation of these different types of slot patterns requires a very flexible preamble design. Accordingly, a preamble according to the present invention may include one or multiple indications to include a multiuser interlace or single user interlace indication, a multiplexing pattern or information, and a user identification information. The multiplexing pattern or information may include information that indicates subband pattern, TDM pattern, OFDMA multiplexing pattern, spatial multiplexing pattern, or superpositioning precoding pattern. The user identification information indicates which users to be served, and may include MAC ID or bit mapping information.

According to EVDO revisions 0, A, and B, the preamble is a Walsh sequence which is time division multiplexed with traffic channel. However, according to EV-DO revision C, a MIMO preamble is signaled over OFDM dedicated spatial pilots (DSPs) instead of a code division multiplex (CDM) preamble. The preamble information is the 8-bit MAC-ID and potentially 2 extra bits for rate indicator. According to the present invention, under EV-DO revision C, OFDM-MIMO, the DRCs are defined for every rank, and, if the signaled (DRC, M) is below THDRC, only the 8-bit MAC-ID is signaled. In addition, in the OFDMA interlace according to the present invention, more than one MAC-ID will be transmitted to signal all served ATs in the same interlace. For each OFDM subband, one MAC-ID is employed to indicate either a single-user packet (SUP) or an EV-DO revision A/B multiuser packet (MUP) to be sent in this subband. For single-user MIMO/OFDM, one MAC-ID with an optional 2-bit rate indicator is enough to signal the AT to be served. For Multiuser MIMO or SDMA, two MAC-IDs with optional 2-bit rate indicator are necessary to signal the two ATs to be served.

Regarding subband OFDMA preambles according to the present invention, a subband pattern indicator is coded and signaled through the location of common spatial pilots (CSPs). A CSP is sent with a nominal value of one percent of the total power per antenna element. Thus, it takes one percent of the transmission power for signaling five subband patterns.

Every OFDMA preamble containing an 8-bit MAC-ID and an optional 2-bit rate indicator is coded and sent through one set of DSPs in a first slot to indicate the corresponding AT(s) to be served in the interlace. Each OFDMA preamble is sent through 120 OFDM tones. Thus, there are 15 OFDM tones per OFDM symbol with 4 OFDM symbols per slot. Consequently, it takes $15/180=1/12$ of the transmit power for every 8 or 10 bits of each preamble.

Regarding an interlace preamble to indicate subband allocation, if supported OFDMA patterns are not pre-defined in a SECTORPARAMETER message, a 3-bit interlace type indicator, OFDMA_PATTERN, indicates subband allocation information for the next or current interlace. Exemplary meanings of the 3-bit interlace type indicator are as follows:
  "000"—The whole bandwidth of the next or current interlace is to be used for a MIMO single-user packet, a OFDM single-user packet or a OFDM multiuser packet
  "001"—The bandwidth of the next or current interlace is evenly divided into two subbands and two OFDMA preambles will be sent in the first slot
  "010"—The bandwidth of the next or current interlace is evenly divided into three subbands and three OFDMA preambles will be sent in the first slot
  "011"—The bandwidth of the next or current interlace is evenly divided into four subbands and four OFDMA preambles will be sent in the first slot
  "100"—The whole bandwidth of the next or current interlace is to be used for multiuser MIMO or SDMA, in which two users share the whole bandwidth with their precoding PMIs, and two MIMO/OFDM preambles will be sent
  Other values of the 3-bit indicator are reserved If the supported OFDMA patterns are pre-defined in the SECTORPARAMETER message, OFDMA_PATTERN will be used to signal which predefined OFDMA_PATTERN will be used for the next interlace.

Regarding an interlace OFDMA preamble, AT assignment is signaled through OFDMA preambles sent in the first slot of an OFDMA interlace. For a single-user interlace, only one OFDMA preamble is transmitted in the first slot. For a multiuser OFDMA interlace, more than one preamble are sent in the first slot. Each OFDMA preamble is carried through one set of pilots, which is either layer 1 DSPs if MIMO is used or OFDM pilots if MIMO is not used. The OFDM pilots share the same pattern and modulation as the layer 1 DSPs. Each set of the OFDM pilots has 120 OFDM tones evenly distributed in the 4 symbols of the first slot of each interlace. Each set of the OFDM pilots carries an 8-bit MAC ID. The DSP tones for each OFDMA preamble are equi-spaced for better channel estimation and are randomly allocated across sectors, and include the following indications:
  Pilot offset f: the position of the first pilot tone is on the first layer, which is a function of Sector ID and the MAC-ID of the first subband or the first served AT
  DSP size j(M): The number of DSP per layer, for instance, 10 for M=3
  DSP spacing q(M): 180/j(M)
  DPS location DSP(n,m): Tone locations for layer n in OFDM symbol m The transmitted modulation symbols on DSPs are scrambled with a pseudorandom sequence that is a function of the following:
  sector ID,
  slot index,
  sub-packet index,
  the served user preamble information, which a 8-bit MAC-ID and an optional 2-bit rate indicator.
  the layer index (n).

For an interlace preamble that is employed to indicate preamble multiplexing, for the sake of simplicity, if there are more than one subbands allocated, one and only one subband will be allocated for single-user MIMO transmission and the rest will carry one OFDM packet per subband. Consequently, according to the present invention, an OFDM packet may be a single-user or multiuser OFDM packet. MIMO DSP spacing is 12 tones when the rank is 1, 6 tones when the rank is 2 or 3, and 5 tones when the rank is 4. The offset between DPS and OFDM pilots is approximately 3 tones when the subband size is 2, approximately 2 tones when the subband size is 3, and 1 tone when the subband size is 4.

The present invention also contemplates an option to pre-define multiple supported OFDMA subband patterns. Accordingly, supported OFDMA subband patterns can be signaled through the SECTORPARAMETER message and thus it is not necessary for a sector to support all OFDMA subband patterns. The specific OFDMA subband pattern to be used for the next interlace will still be signaled through the location of common spatial pilots (CSP). If only two OFDMA subband patterns are supported, only two CSP locations are possible. Advantageously, this feature may help lower the OFDMA subband pattern detection false alarm rate and the interlace preamble patterns.

In an embodiment where the entire 1.2288 MHz bandwidth is divided up into four subbands of 0.3072 MHz each, the subband allocation pattern is fixed broadcasted through an added n-bit field, OFDMAPATTERN, in the existing SECTORPARAMETER message. In figure, the IFDMAPATTERN is 3 bits. Another exemplary values of OFDMAPATTERN are as follows:
  "0000"—single band with multiuser MIMO or SDMA disabled
  "0001"—two subbands: one ¾ and the other ¼
  "0010"—three subbands: one ½, another ¼, and a third one ¼
  "0100"—three subbands: one ¼, another ¼ and a third one ½
  "1000"—two subbands: one ¼, and the other ¾
  "0011"—two subband: one ½ and the other ½
  "0110"—three subbands: one ¼, another ½, and a third one ¼
  "1111"—single band with multiuser MIMO or SDMA enabled In one embodiment, one sector shall support at least one OFDMA pattern, and which OFDMA pattern is used for the next interlace transmission is signaled through the location of common spatial pilots.

Figure 8:
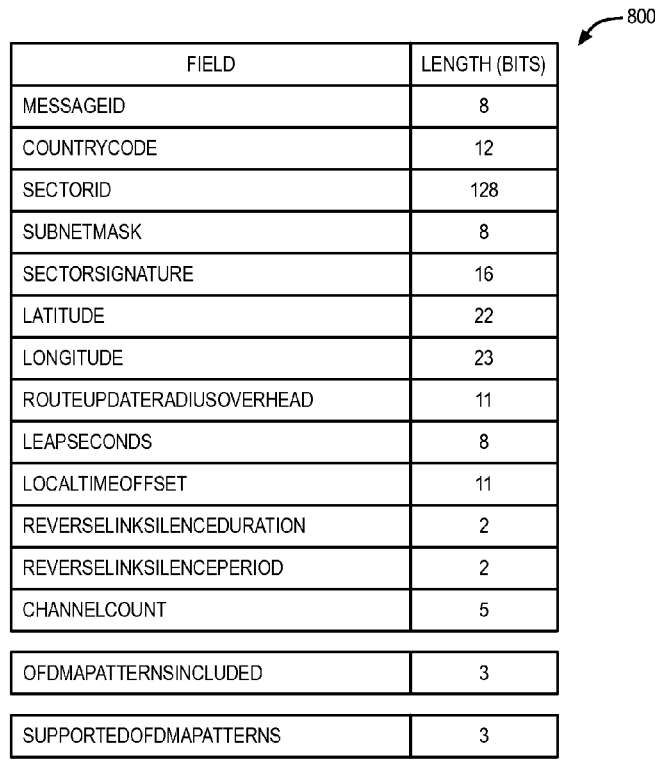
FIG. 8 is a block diagram highlighting a modified SECTORPARAMETER message according to the present invention.

Now turning to FIG. 8, a block diagram is presented highlighting a modified SECTORPARAMETER message 800 according to the present invention. The message 800 includes two additional fields: OFDMAPATTERNSINCLUDED and SUPPORTEDOFDMAPATTERNS.

In one aspect of the present invention, there is a subband cycling or slow hopping operation on the subband allocation for OFDMA multiuser transmission. Hence, subband cycling is operated on both traffic and DSP transmissions and subband is cycled in the unit of a slot. Thus, subband cycling not only helps maximize the frequency diversity for each subband packet but also helps maintain the whole channel estimation of each AT.

In order to improve the detection performance of the OFDMA pattern used for the next interlace, a parameter, OFDMA_DUTY_CYCLE, is defined in the unit of slot. Only when SYSTEM_TIME mod OFDMA_DUTY_CYCLE=0, the OFDMA pattern and the location of common spatial pilots are allowed to change. Thus, each in-use OFDMA pattern lasts at least one OFDMA_DUTY_CYCLE slots. An AT then has the time of OFDMA_DUTY_CYCLE slots for detecting the OFDMA pattern used in the next OFDMA_DUTY_CYCLE slots and the AT may only use the CSPs in the same interlace positions for detecting the OFDMA pattern change.

Though most of previous aspects focus on subband OFDMA, those aspects of the present invention are also applicable to other multiuser multiplex access schemes. For example, subband OFDMA is one of the features employed to multiplex packets for multiple ATs. Other contemplated packet multiplexing approaches include sub-slot TDMA and distributed OFDMA. For sub-slot TDMA, each packet is transmitted in the unit of one ⅛ slot, one quarter slot or one half slot, and different packets are interlaced inside one DO interlace. For distributed OFDMA, each packet is transmitted in a subset of OFDM tones and multiple packets are OFDMA'd.

Now referring to FIG. 9, a block diagram is presented showing a modified SECTORPARAMETER message 900 for an embedded OFDMA preamble according to the present invention. The modification comprises an additional field, ANCHORSUBBANDPOSITION. As before, the 1.2288 MHz bandwidth is divided into four subbands of 0.3072 MHz each. An anchor subband is the subband(s) which carries all OFDMA MUP preamble or packet information. The position of the anchor subband is conveyed through the n-bit field, ANCHORSUBBANDPOSITION, In FIG. 9, the ANCHORSUBBANDPOSITION is 4 bits, another exemplary values as follows:

"0000"—There is a standalone multiuser packet preamble
"0001"—subband 0 is anchor subband
"0010"—subband 1 is anchor subband
"0100"—subband 2 is anchor subband
"1000"—subband 3 is anchor subband
"0011"—subbands 0 and 1 are anchor subbands
"0110"—subbands 1 and 2 are anchor subbands
"1100"—subbands 2 and 3 are anchor subbands
"0111"—subbands 0, 1, and 2 are anchor subbands
"1011"—subbands 0, 1, and 3 are anchor subbands
"1101"—subbands 0, 2, and 3 are anchor subbands
"1110"—subbands 1, 2, and 3 are anchor subbands
"1111"—anchor subband consists of all subbands When the value of ANCHORSUBBANDPOSITION is not equal to "0000," there is an anchor subband and the OFDMA preamble is sent through anchor subband.

Figure 10:
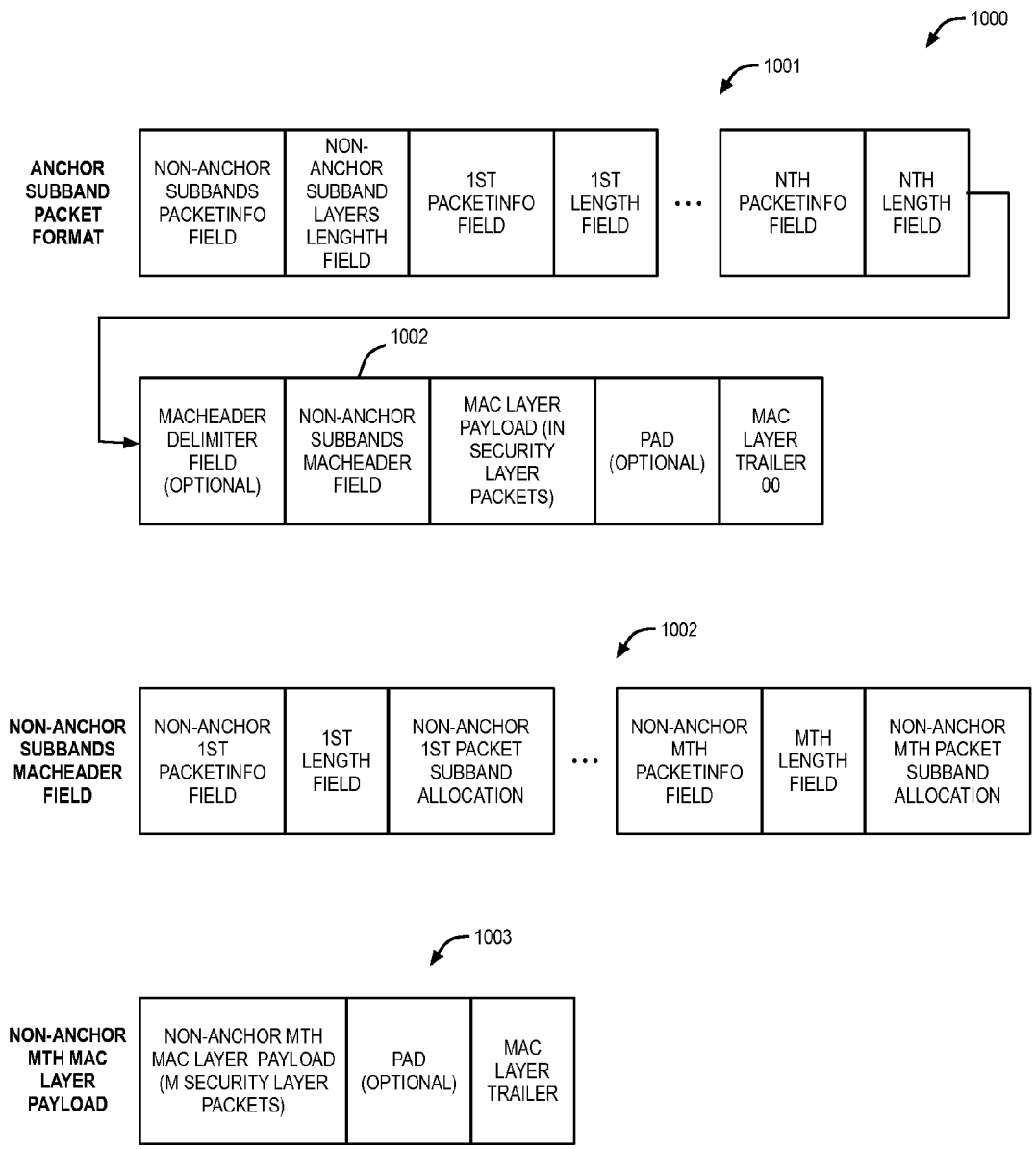
FIG. 10 is a block diagram featuring an embedded OFDMA preamble structure according to the present invention.

Turning to FIG. 10, a block diagram 1000 is presented featuring an alternative embedded OFDMA preamble structure according to the present invention. The diagram 1000 is shows a format according to the present invention of a forward traffic channel multi-user MAC layer packet 1001 for the anchor subband. The multi-user MAC layer packet 1001 includes a non-anchor subbands packetinfo field, non-anchor subbands layers length field, a layer 1 $1^{st}$-$N^{th}$ packetinfo and length fields, an optional MACheader delimeter field, a non-anchor subbands MACheader field 1002, a MAC layer payload, an optional pad field, and a MAC layer trailer field. The non-anchor subbands MACheader field 1002 includes up to M non-anchor packetinfo fields, length fields, and packet subband allocation fields. A non-anchor Mth MAC layer payload 1003 includes a non-anchor Mth MAC layer payload field along with an optional pad field and a MAC layer trailer.

An anchor packet is used to carry the subband allocation information for both MIMO and non-MIMO packets, the MAC-ID and optional rate information for each packet, and the packet for the served AT(s) with the lowest DRC request. The anchor packet can be easily decoded by other ATs with higher DRC request and especially MIMO AT(s). The MAC header of non-anchor subband packets is embedded as one MAC layer payload. The subband allocation for each non-anchor packet is also indicated in the anchor subband's non-anchor subbands MAC header field.

When there is no power boosting on the anchor subband, one way to improve the reliability of anchor subband is to do slow hopping. Thus, when ANCHOR_CYCLING is set to 0 or anchor subband cycling is on, the position of anchor subband is cyclic shifting every symbol for maximizing the frequency diversity. There is no change on pilot pattern.

Subband fractional frequency reuse is allowed to boost the Tx power of some subbands, including the anchor subband for improving cell-edge user experience. Subband interference avoidance is achievable in subband domain, in addition to time domain (slots) and space domain (sectors).

In the existing EV-DO revisions 0/A/B, every packet transmission is in the unit of slot, which is 2048 chips with two 96-chip CDM pilots, 4 64-chip MAC channel and 4 400-chip data sub-slots. Usually, the transmission of multiple packets in the forward link is time division multiplexed, that is, the AN transmits one subpacket for only one packet every 4 slots. The cycle usually is 4 slots in order to minimize transmission latency and maximize time diversity.

One aspect of the present invention, as is applicable to EV-DO revision C, balances the tradeoff between MIMO packet transmissions with other packets transmission by extending the transmission cycle of MIMO transmission. For the sake of strictly backwards compatibility, the AN will transmit at least one EV-DO revision C subpacket every 4 slots. There are 4 interlaces defined in EV-DO revisions 0/A/B. In EV-DO revision C, at least one of the interlaces will be an OFDM or EV-DO revision C interlace. All interlaces are transmitted alternatively by the AN.

One embodiment for transmitting EV-DO revision C packets is to transmit one MIMO subpacket every 16 slots. Since the AN transmit 4 EV-DO revision C subpackets in 16 slots interval or every one EV-DO revision C subpacket every 4 slots, the other 3 EV-DO revision C subpackets will be the subpacket of other EV-DO packets. One application is the other 3 subpackets are the subpackets of OFDM packets for delay sensitive services.

Figure 11:
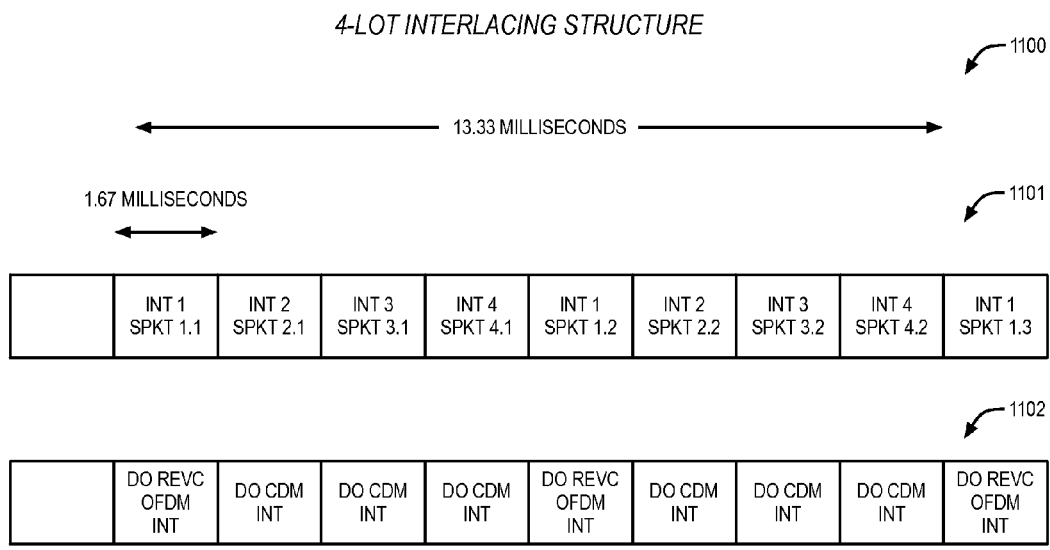
FIG. 11 is a diagram illustrating a 4-lot interlacing structure according to the present invention.

FIG. 11 is a diagram 1100 illustrating a 4-slot interlacing structure according to the present invention which depicts slots 1101 and 1102 in the alternative interlacings as described above.

Figure 12:
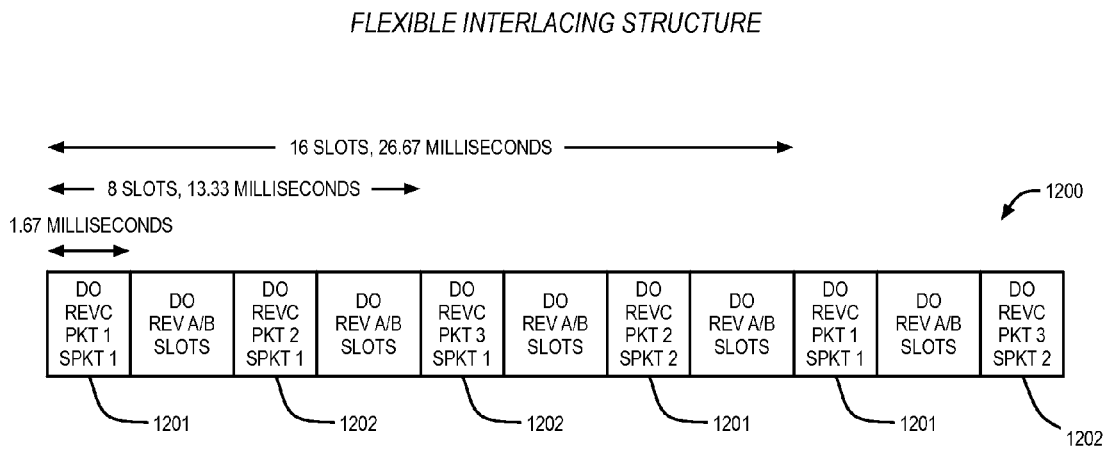
FIG. 12 is a diagram showing a flexible interlacing structure according to the present invention.

FIG. 12 is a diagram showing a flexible interlacing structure according to the present invention. In this diagram, a slot 1200 shown having EV-DO revision C packets 1201, 1202 interlaced with EV-DO revision A/B packets. However, packets 1201 correspond to single user packets or packets for non-delay sensitive services with long transmission cycles, while packets 1202 are multiuser packets or packets for delay sensitive services with short transmission cycles.

One aspect of the present invention comprehends a two-level multiuser preamble. Thus, there are two-level indicators in each multiuser preamble. The first indicator denotes the following packet is single-user packet or multiuser interlace where a single-user packet means the following interlace is dedicated for one user and a multiuser interlace means the following interlace is shared by more than one users. The first indicator can be CDM modulated, OFDM modulated, or modulated on existing pilots, such as OFDM pilots, dedicated spatial pilots or common or shared spatial pilots. In addition, the first indicator is optional. The second indicator denotes which user(s) are to be served in the following interlace. This is done through sending the served user(s) ID, such as MAC-ID. Alternatively, this is done through transmitting multi-bit bit-mapping information, in which one or more bits, ON or OFF, denote one user will be served or not. The second indicator can be CDM modulated, OFDM modulated, or modulated on existing pilots, such as OFDM pilots, dedicated spatial pilots or common or shared spatial pilots.

Figure 13:
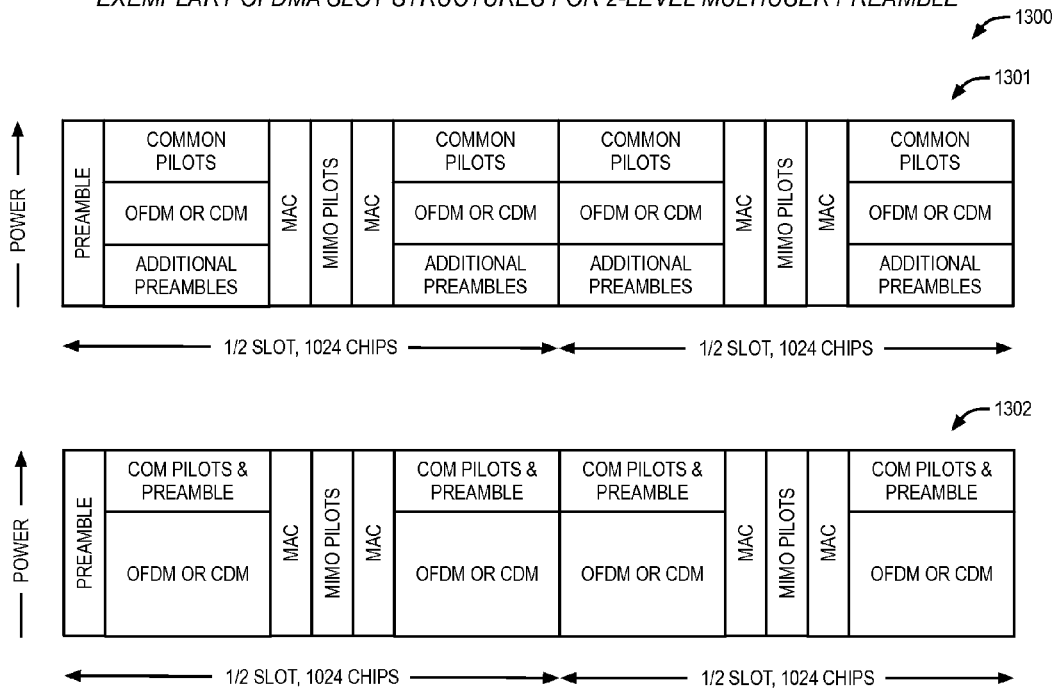
FIG. 13 is a diagram featuring exemplary OFDMA slot structures for 2-level multiuser preamble according to the present invention.

FIG. 13 is a diagram 1300 featuring exemplary OFDMA slot structures 1301, 1302 for 2-level multiuser preamble according to the present invention. The slot is modulated by increasing transmit power. In the diagram 1300, the first indicator is sent through a CDM sequence like EV-DO revision 0/A/B, which indicates which AT will be served in the next interlace or transmission, or indicates the following transmission or interlace is a multiuser transmission or multiuser interlace. After this, if the transmission or interlace is for more than one user, additional OFDM preambles will be transmitted to signal the ATs to be served. These additional OFDM preambles can be carried through OFDM pilot tones, some OFDM data tones or embedded inside the transmitted the packet, which an AT needs to decode before figuring out which ATs are being served.

Figure 14:
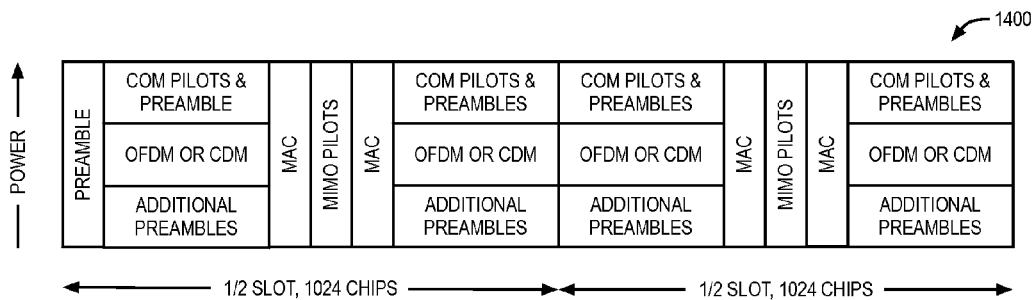
FIG. 14 is a diagram detailing an exemplary OFDMA slot structure for 2-level preamble according to the present invention.
Figure 15:
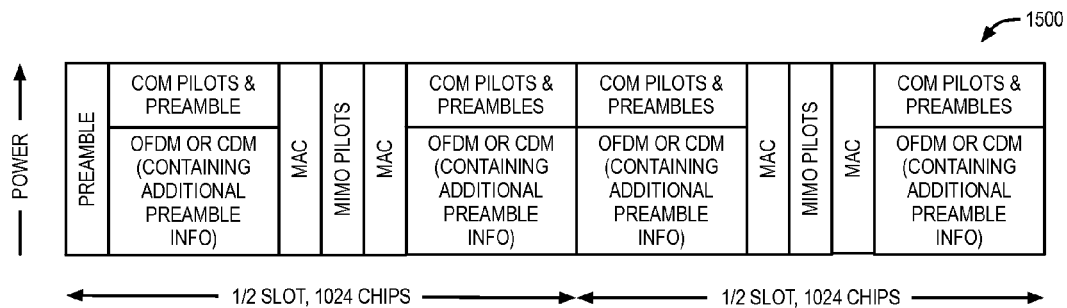
FIG. 15 is a diagram showing an alternative exemplary OFDMA slot structure for 2-level preamble according to the present invention.

FIG. 14 is a diagram detailing an exemplary OFDMA slot structure 1400 for 2-level preamble according to the present invention. This alternative also is modulated via power levels FIG. 15 is a diagram showing an alternative exemplary OFDMA slot structure 1500 for 2-level preamble according to the present invention. This information is also power modulated.

In addition, for MIMO OFDM, there are two-level OFDM pilots. One is called common/shared spatial pilots, which are for channel estimation, spatial signaling, or precoding matrix/signature index generation. The other one is called dedicated spatial pilots, which are used for channel estimation and demodulating OFDM data tones. Accordingly, the first common/shared spatial pilots can be used to carry one level multiuser preamble information, say the first level preamble, which indicates the following transmission or interlace is multiuser or single user or what is the multiuser multiplexing pattern. The dedicated spatial pilots can be used to carry the other level preamble information, say the second level preamble, which specifies which ATs to be served.

It is widely held by those in the art that it is possible to achieve 66 VoIP ATs per sector under EV-DO revision A. The only limitation that now exists under EV-DO revision A/B is that of available AT MAC indices, which is up to 114. One aspect of the present invention includes breaking this limitation by reusing the MAC indices between CDM mode (EV-DO revisions 0/A/B) and OFDM mode (EV-DO revision C and beyond). This means that one EV-DO revision C AT can have two separated MAC indices if it has both CDM and OFDM sessions. One is for the CDM connection and one is for the OFDM connection. If the AT only has OFDM connection, it will be only assigned one MAC index This means that the AT is operating in a so-called EV-DO revision C stand-alone mode.

Another implication is that the CDM session MAC indices are overlapped with OFDM session MAC indices. This is possible since a CDM only AT cannot decode an OFDM preamble. This means that even if an EVDO revision C OFDM AT reuses the same EV-DO CDM MAC index, there would be no conflict as long as the same MAC index is be used at the same time for both ATs.

Even though it is used at the same time for both ATs, an AN can code the data packet in such a way that only one of them can be possibly to successfully decode the packet. With the above approach, the physical layer MAC-ID will not be a direct map to the MAC layer and above MAC ID, since the same physical layer MAC ID may be mapped to different ATs, depending on if it is served in CDM interlace or OFDM interlace or on which version air interface it is served. The MAC and above layer MAC ID may be longer and have more bits than the physical layer MAC-ID, which typically is 7 or 8 bit long.

Figure 16:
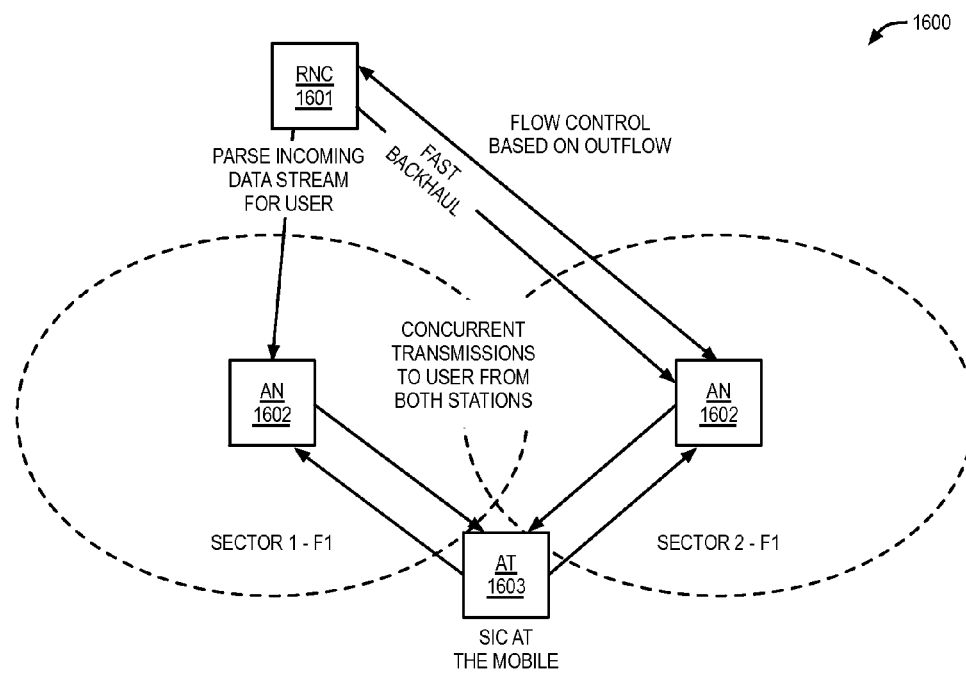
FIG. 16 is a block diagram highlighting an interference cancellation mechanism according to the present invention.

Turning now to FIG. 16, a block diagram 1600 is presented highlighting an interference cancellation mechanism according to the present invention. The diagram 1600 depicts a radio network controller (RNC) 1601 that is coupled to two access nodes (ANs) 1602. Each of the ANs 1602 provides coverage for one of two sectors SECTOR 1, SECTOR 2. Both of the ANs 1602 employ the same frequency F1 for transmission to an AT 1603.

In operation, the AT 1603 receives concurrent transmissions from both ANs 1602. The RNC 1602 parses the incoming data stream for the user and provides this to the AN 1602 corresponding to SECTOR 1. The RNC and AN 1602 corresponding to SECTOR 2 utilize fast backhaul mechanisms and practice flow control based on outflow. Interference cancellation is practiced by the AT 1603.

According to the present invention, there are two alternative embodiments for interference cancellation. A first embodiment is infrastructure based, which requires cooperation and coordination between the ANs 1602. This embodiment also requires significant changes to standards and hardware. A second embodiment is mobile based and practiced by the AT 1603.

As one skilled in the art will appreciate, there are two major sources of interference for systems such as CDM EV-DO. The first source is inter-chip interference, which is generally address by an equalizer. The second source is adjacent cell interference, and which is typically handled by an interference canceller. These two sources are not, however, independent. For example, an effective equalizer significantly impacts the performance of an adjacent interference canceller. Thus, the present inventors not that there are generally two key components that are required in design of an effective interference canceller. First, estimation of interference power is usually performed by tracking pilot channels. Secondly, there is interference waveform estimation, which can be performed via several different techniques depending upon tradeoff criteria relating to performance and complexity.

It is noted that one of the challenges for interference cancellation is how to accurately estimate the interference power, which will in turn decide the scaling factor for reconstructing interference before cancelling it. And for EV-DO RL, interference power estimation is more difficult than in the FL, because the RL pilot channel, data channel, and other control channels are overlapped.

In EV-DO FL, the traffic channel, control channels, and pilot channels are time division multiplexed together so that there is no interference between each other in the same sector. This also makes the channel estimation much easier.

Likewise, there generally are two kinds of interference cancellation techniques: interference waveform estimation based and projection based. Since each traffic channel takes all degrees of freedom of the channel in EV-DO, it is very challenging to design a projection-based interference canceller of good performance, at least a pure projection-based implementation. Thus, for interference waveform estimation, there are at least two approaches: waveform estimation with channel decoding and waveform estimation with no channel decoding. Waveform estimation with channel decoding is one approach used by AN for RL interference cancellation.

Clearly, channel estimation with channel decoding yields a much more accurate interference waveform estimation than the no channel decoding approach, especially when Eb/Nt or SINR is relatively low. Yet, in the EV-DO FL, the things work differently between FL and RL. In FL, each AT has no idea of the coding and modulations used in the interfering signals for other ATs. And FL early termination makes it more difficult for the AT to decode the interference. This means the modulation/coding of interfering signals can change during the procedure of interference cancellation. Additionally, a complete decoding the interference needs the possible store of multiple slots of interference signal. Hence, successful decoding of interference is not guaranteed, due to the different target reception conditions. Consequently, it is advisable to perform uncoded or symbol-level interference cancellation, in which each AT only demodulates the interfering signal, and does not decode it. It is noted that it is difficult for ATs to do the coded or bit-level interference cancellation, as in EV-DO revision A RL.

Accordingly, the present invention provides for a 2-stage approach to interference cancellation. Stage 1 is provided to improve the equalization performance. Stage 2 is a result of improving equalization, which is performing equalization on interfering signals as well. After equalizing the interfering signals, the present invention contemplates both demodulation and reconstruction of these signals. After reconstructing the interfering signals, they are removed from the received composite signal. Finally, after removing interference, the result is a cleaner version of desired signals remaining, which can then be demodulated and decoded. This procedure for interference cancellation can be performed both iteratively and in parallel with other techniques.

Figure 17:
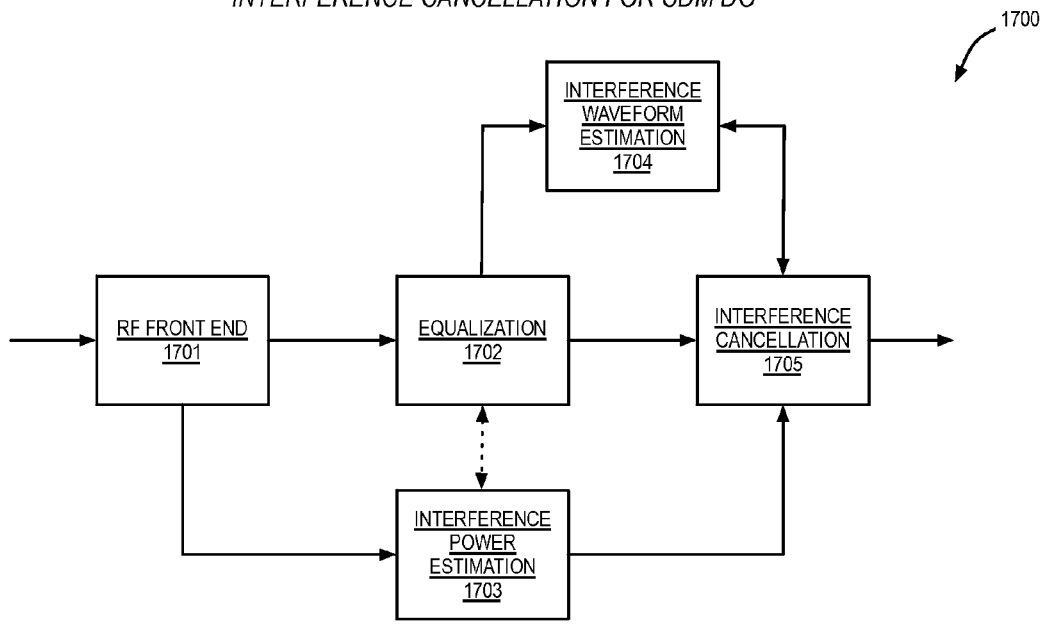
FIG. 17 is a diagram featuring an interference cancellation flow for CDM DO according to the present invention.

FIG. 17 is a diagram 1700 summarizing the flow for interference cancellation for CDM EV-DO according to the present invention, as described above. At block 1701 desired signals and interference is received into an RF front end. Interference power estimation 1703 is performed on the received signals in parallel with equalization 1702. Equalized waveforms are provided to an interference waveform estimation block 1704. And the results of interference waveform estimation 1704, equalization 1702 and interference power estimation 1703 are provided to an interference cancellation block 1705 whose output is better quality desired signals.

There are many challenges in implementing FL interference cancellation in the same way as in RL. The transmission format of neighbor ANs are unknown in terms of both modulation and coding rate. In addition, early termination timing and scheduling of neighbor ANs are unknown, if there is no synchronization between ANs. Consequently, it is easier and not unreasonable for an AT to cache the whole interlace before working on its own subpackets.

Depending upon the scenario, interference cancellation can be done at the symbol, chip level, or bit level. In an unsynchronized case, if only one received signal from multiple ANs is desired, then the AT will do these two processes in parallel and see which one succeeds before the other. First, the AT will attempt to estimate the interference waveform before demodulation, then cancel it from received signal and finally demodulate the desired packet. In parallel, the AT will attempt to directly demodulate and decode the desired packet.

In a synchronized case, if both received signals from two ANs in the same slot are desired, then the AT will do interference cancellation for each packet in addition to the direct demodulation/decoding on each packet. Assuming the same traffic channel transmit (Tx) power from neighbor ANs, Ec/Nt←−3 dB for 2-way SHO and Ec/Nt←−4.8 dB for 3-way soft handoff, which makes accurate interference cancellation estimation very challenging, one way to improve interference estimation is to temporally decrease the Tx power of one of the ANs.

For the unsynchronized case, when an AN knows it is the secondary serving AN for the AT and it has one packet to be scheduled to it, then this AN will send the packet to it with lower Tx power or a smaller T2P ratio. The synchronized case merely requires that one of the serving ANs send packets to the AT with lower Tx power or a smaller T2P ratio.

The present inventors not there are two reasons to temporally lowering one Tx power in the serving slots or interlace. First, doing so improves the performance of interference estimation. Secondly, doing so helps the early termination of the packets of strong Tx power. This will in turn improve the interference cancellation in the synchronized case.

The performance of interference cancellation in the FL largely depends on the channel estimation for both desired signal and interference. With minimizing the residual un-cancelled power, the present inventors have derived the interference cancellation scaling factor α and residual power Pr as follows:

$$\alpha = SNR\text{pilot} * L / (1 + SNR\text{pilot})$$

$$Pr = 1 / (1 + L * SNR\text{pilot})$$

Figure 18:
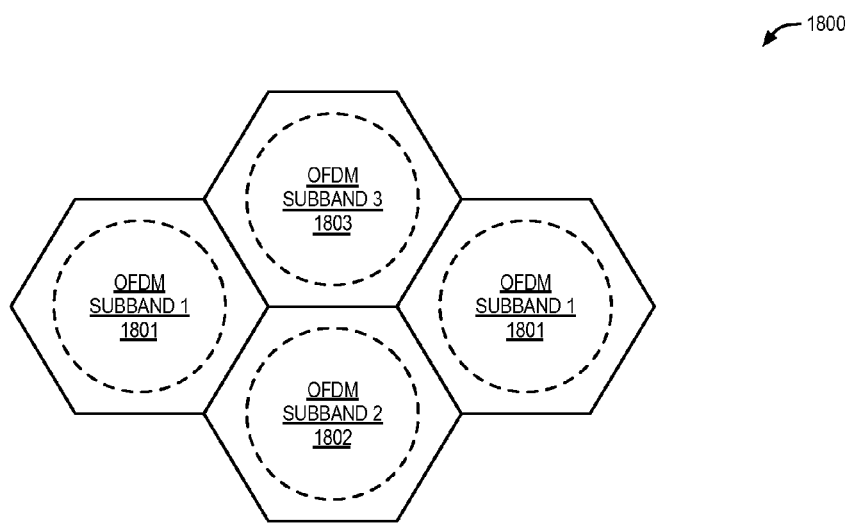
FIG. 18 is a block diagram illustrating deployment of subband OFDM according to the present invention.

FIG. 18 is a block diagram 1800 illustrating deployment of subband OFDM according to the present invention. In particular, the diagram 1800 depicts two ANs 1801 operating in a first subband SUBBAND 1, a second AN 1802 operating in a second subband SUBBAND 2, and a third AN 1803 operating in a third subband SUBBAND 3.

For OFDM EV-DO, the deployment of FIG. 18 operates to improve cell-edge performance as well as multi-stream transmission performance by implementing subband interference avoidance according to the present invention. Accordingly, with subband based fractional frequency reuse, when a cell-edge AT has a simultaneous connection with multiple ANs 1801-1803, the FL transmission from different ANs 1801-180-3 to the same AT will happen on different subbands to avoid interfering each other. Thus, subband interference avoidance may be taken as another form of fractional frequency reuse, in which the frequency bandwidth of each sector is a fractional of the total available frequency bandwidth.

In deploying subband interference avoidance or fractional frequency reuse, the whole carrier, for example, one 1.2288 MHz CDMA2000 carrier, is divided into to multiple subbands, say three subbands SUBBAND 1-3 as is shown in the diagram 1800. Each cell or AN 1801-1803 will be assigned the total available subbands. However, each AN 1801-1803 assigns a different transmit power for each subband SUBBAND 1-3. This is called the power imbalance between subbands. There are two ways according to the present invention to assign different transmit power for each subbands. A first embodiment contemplates permanently assigning different transmit power to different subbands so that all the ATs inside the cell can be served through all subbands, however, only the ATs on the cell edge may only be served through the subband of strong transmit power. A second embodiment considers dynamically assigning power on each subband. When an AT to be served is inside the cell, there will be less power imbalance between subbands for this AT. However, when an AT is on the cell-edge, it will be served through the best subband(s) or through a predefined subband(s).

In the case where one AT is in the soft handoff region and has connections to more than one AN 1801-1803, the interference between the multiple connections in the same carrier can be an issue. However, if the subband interference avoidance and subband OFDMA are employed as described above, the connections to different ANs 1801-1803 may be in different subbands. In that case, there would be no interference between them because they are in different subbands.

Figure 19:
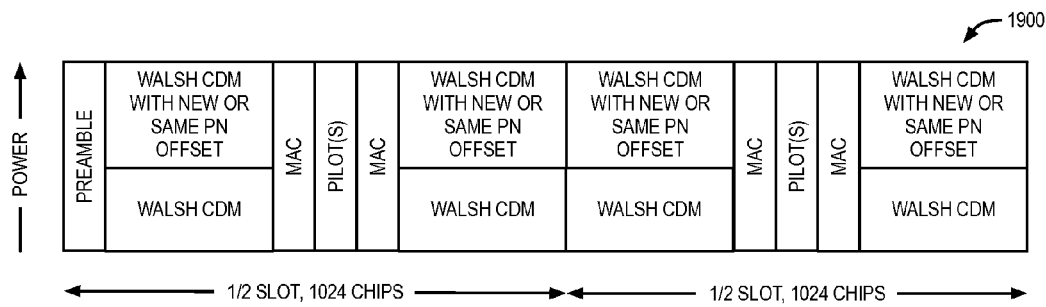
FIG. 19 is a block diagram showing a slot structure for enhancement layering according to the present invention.

Turning now to FIG. 19, a block diagram is presented showing a slot structure 1900 for enhancement layering according to the present invention. The technique employs modulation of differing transmit powers as described above in order to multiplex traditional Walsh CDM data at one power level, while providing Walsh CDM with a new or the same pseudorandom number (PN) offset at another power level. A preamble is provided according to the present invention in order to indicate the data therein.

Operationally, a completely independent MAC index assignment between EV-DO interlace and OFDM interlace is viable for forward link transmission, since the CDM interlace and OFDM interlace are independent to each other, and since the false alarm rate between these two is presumed to be very low. Thus, an advantage of MAC index reuse can help maintain strict backwards compatibility as well as simplify preamble design. However, MAC index reuse can only be applied at the physical layer. An additional bit is necessary for the MAC layer and the upper layer to uniquely map traffic/stream to the desired AT. In one embodiment, for example, the additional field is included in the TrafficChannelAssignment message to indicated whether the assigned MAC index is for OFDM traffic or CDM traffic.

Thus, there is a tradeoff between control overhead and achievable performance in terms of throughput and delay. Though only one MAC-ID preamble is enough to signal the AT(s) to be served at either high throughput or low delay, a balance is desirable. For better support of both high-data rate AT/services and delay-sensitive ATs/services, it is necessary according to the present invention for an AN to serve multiple ATs in one interlace. OFDMA is a way for efficiently multiplexing multiple ATs in a single interlace. Consequently, a flexible preamble design is necessary to accommodate the dynamic nature of multiuser scheduling.

The structure 1900 of FIG. 19 depicts a two-layer transmission. The base layer transmission is the same as EV-DO revision A/B and an enhancement layer is added with new PN offset and lower Tx power. Advantageously, the power imbalance between these two CDM layers can help the signal demodulation by receivers. Legacy or inferior users will successfully decode the base layer message. Superior users will decode both layers with successful interference cancellation.

Figure 20:
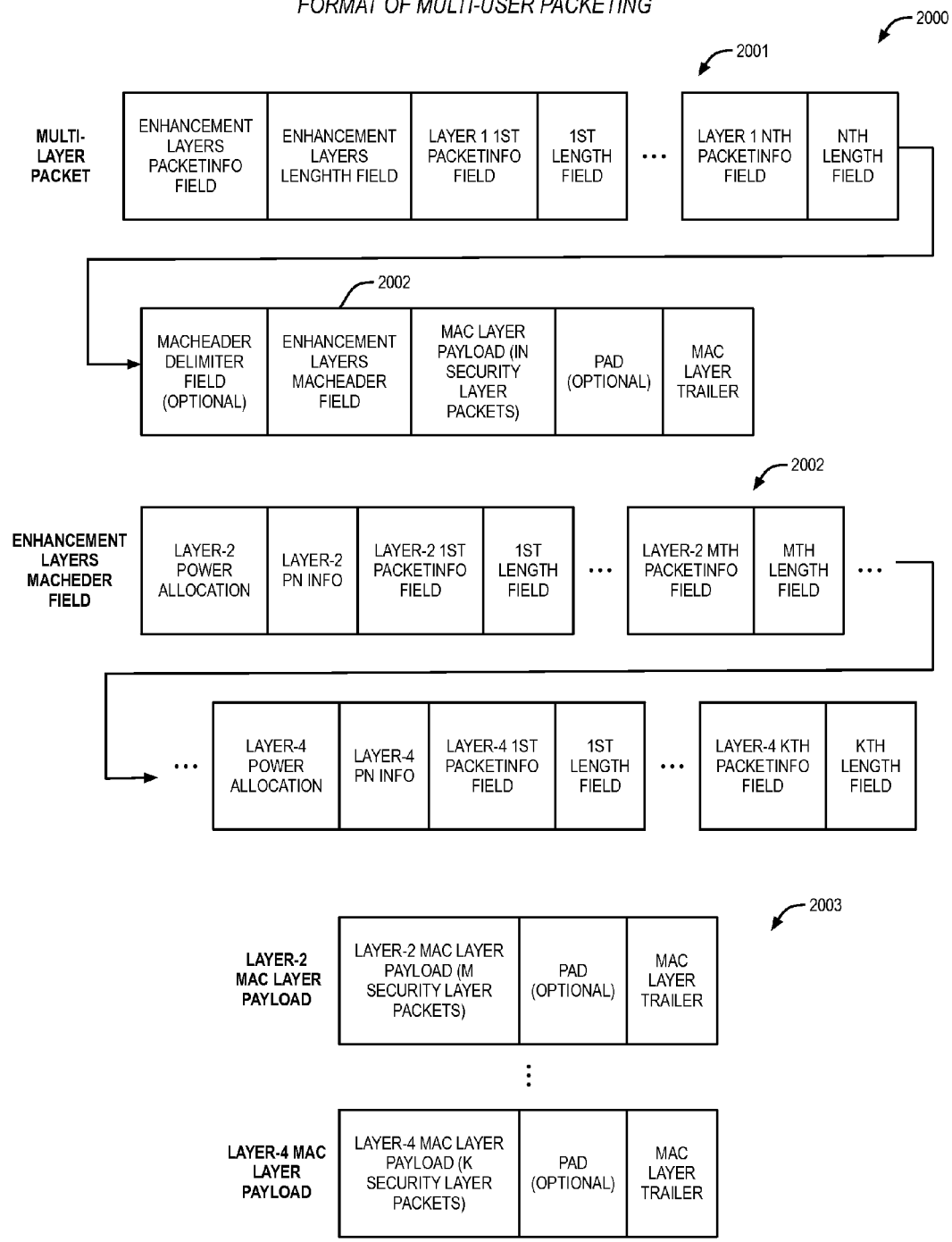
FIG. 20 is a block diagram featuring a multi-user packeting format according to the present invention.

Referring now to FIG. 20, a block diagram is presented featuring a multi-user packeting format according to the present invention. The diagram 2000 shows a multi-layer packet 2001, which includes an enhancement layers packet-info field, an enhancement layers length field, from 1 to N layer 1 packetinfo and length fields, an optional MACheader delimiter field, an enhancement layers MACheader field 2002, a MAC layer payload field, an optional pad field, and a MAC layer trailer field.

The enhancement layers MACheader field 2002 includes a layer-2 power allocation field, a layer-2 PN info field, from 1 to M layer-2 packetinfo and length fields, a layer-3 power allocation field, a layer-3 PN info field, from 1 to J layer-3 packetinfo and length fields, a layer-4 power allocation field, a layer-4 PN info field, and from 1 to K layer-4 packetinfo and length fields. Layer-2 through layer-4 MAC layer payloads 2003 are shown that include a layer-2 MAC layer payload field having M security layer packets, an optional pad field, and a MAC layer trailer. The layer-4 MAC layer payload includes a layer-4 MAC layer payload field having K security layer packets, an optional pad field, and a MAC layer trailer.

It is noted that the MAC head of non-anchor subband packets is embedded as one MAC layer payload and the subband allocation for each non-anchor packet is also indicated in the anchor subband's non-anchor subbands MACheader field.

Figure 21:
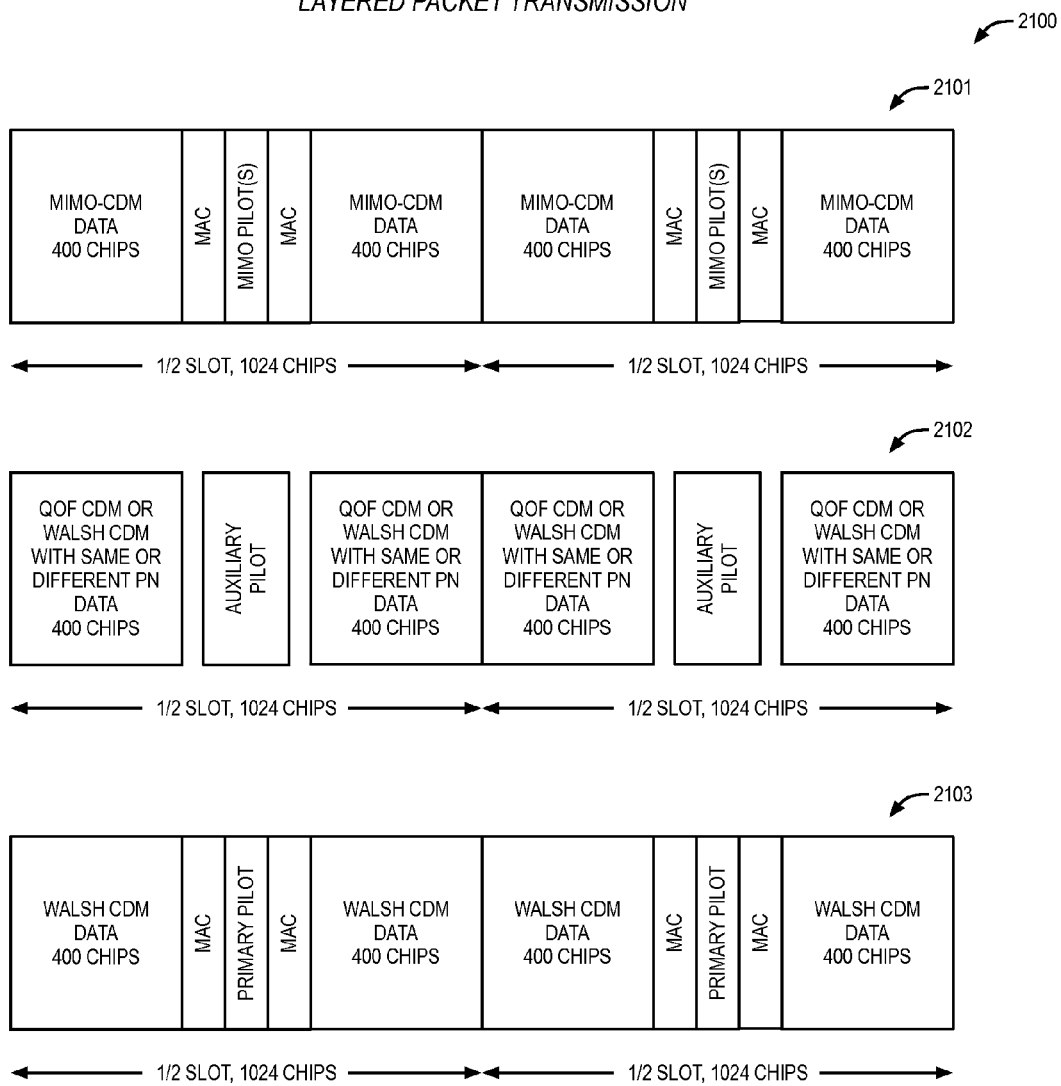
FIG. 21 is a block diagram illustrating layered packet transmission according to the present invention.

Turning to FIG. 21, a block diagram 2100 is presented illustrating layered packet transmission according to the present invention. Three different slot structures 2101-2103 are shown. A first slot structure 2101 is employed to transmit MIMO-CDM data is utilizes one or more MIMO pilots. A second slot structure 2102 is employed to transmit QOF CDM or Walsh CDM data with the same or different PN and utilizes an auxiliary pilot. A third slot structure 2103 is employed to transmit traditional Walsh CDM data and utilizes a primary pilot.

In any of the slot structures 2101-2103, the present invention may provide for two independently demodulatable/decodable packets which are transmitted through two different antennas. In one embodiment, the packet sent through a primary antenna has more transmission power. An additional and optional pilot may be transmitted from a secondary AN transmit antenna. The purpose of the auxiliary pilot is to support decode of the FL traffic sent through the secondary antenna. The auxiliary pilot can be scrambled with the PN sequence of with a different PN offset and/or transmitted through Q channel. There is no MAC channel transmission on the secondary antenna. Optionally, an additional MAC channel can be sent through the secondary antenna.

For multiuser CDM MIMO, a dual-antenna CDM packet essentially is a multiuser packet. The preamble information is only transmitted through the primary antenna. And the MAC-IDs for the served ATs are in the subpacket by the primary antenna.

What is claimed is:

1. A method for coupling a plurality of access nodes wirelessly to a plurality of access terminals, the method comprising:
   scheduling the plurality of access terminals to share one of a plurality of subbands through the plurality of access nodes;
   communicating with the plurality of access terminals according to one of the plurality of subbands, the plurality of subbands comprising a plurality of preambles, said communicating further comprising time division multiplexing interlaces corresponding to each of the plurality of access terminals according to the plurality of subbands and the plurality of preambles; and employing a two-level indicator denoting whether a following packet is a single-user packet, a multiuser packet, or a multiuser multiplexing pattern, wherein a first signal of the two-level indicator is OFDM modulated, and a second signal of the two-level indicators indicator denotes which one of the plurality of access terminals is to be served in a following interlace, and wherein the plurality of preambles comprises an interlace indication that indicates subband allocation for a next or current interlace;

wherein said communicating comprises transmitting a system public data field signal indicating which one of the plurality of subbands are configured to a particular access terminal when the particular access terminal sets up connection with one of the plurality of access nodes, said scheduling the plurality of access terminals to share one of the plurality of subbands comprising transmitting multi-layer OFDM multi-user packet data.

2. The method as recited in claim 1, wherein said scheduling the plurality of access terminals to share one of the plurality of subbands further comprises transmitting single-layer OFDM multi-user packet data.

3. The method as recited in claim 1, wherein said scheduling the plurality of access terminals to share one of the plurality of subbands comprises:
transmitting OFDM data according to the plurality of access terminals, wherein at least one of the plurality of subbands transmits a multiuser packet with superposition coding; and
transmitting MIMO data with an antenna which is corresponding to the plurality of terminals, wherein the antenna is determined according to at least one of the following:
beam selection, wherein a beam with strong signal power with a feedback of a preamble message indicator is selected; and
subband selection, wherein the plurality of access terminals calculate the preamble message indicator for a desired subband and report back the preamble message indicator to the access node.

4. The method as recited in claim 1, wherein the plurality of access terminals which shares one of the plurality of subbands is assigned to at least one of a plurality of OFDM cells, and wherein each cell provides a plurality of data rate control signals corresponding to the plurality of subbands.

5. The method as recited in claim 1, wherein the plurality of preambles further comprises:
a first subband which carries preamble or packet of all OFDM multiuser packet data.

6. The method as recited in claim 1, wherein the plurality of subbands further comprises a two-level pilot when said scheduling the plurality of access terminals to share one of the plurality of subbands comprises transmitting both of MIMO and OFDM data, the two-level pilot further comprising:
a common spatial pilot indicating the following transmission or interlace is multiuser or single user; and
a dedicated spatial pilot indicating which access terminal to be served.

7. A system, comprising:
a plurality of access terminals, for sharing one of a plurality of subbands; and
one of a plurality of access nodes, coupled to the plurality of access terminals, the plurality of subbands comprising a plurality of preambles, the one of the plurality of access nodes configured to conduct time division multiplexing interlaces corresponding to each of the plurality of access terminals according to the plurality of subbands and the plurality of preambles, wherein the one of the plurality of access nodes employs a two-level indicator denoting whether a following packet is a single-user packet, a multiuser packet or a multiuser multiplexing pattern, wherein a first signal of the two-level indicator is OFDM modulated, and a second signal of the two-level indicator denotes which one of the plurality of access terminals is to be served in a following interlace, and wherein the plurality of preambles comprises an interlace indication that indicates subband allocation for a next or current interlace, and wherein said one of a plurality of access nodes transmits a system public data field indicating which one of the plurality of subbands are configured to a particular access terminal when the particular access terminal sets up connection with the one of the plurality of access nodes, and wherein said one of the plurality of access nodes transmits multi-layer OFDM multi-user packet data.

8. The system as recited in claim 7, wherein said one of the plurality of access nodes further transmits single-layer OFDM multi-user packet data.

9. The system as recited in claim 7, wherein said one of the plurality of access nodes transmits OFDM data according to the plurality of access terminals, wherein at least one of the plurality of subbands transmits a multiuser packet with superposition coding, and wherein the one of a plurality of access nodes transmits MIMO data with a receiving antenna that corresponds to the plurality of access terminals, and wherein the receiving antenna is determined according to at least one of the following:
beam selection, wherein a beam with strong signal power with a feedback of a preamble message indicator is selected; and
subband selection, wherein the plurality of access terminals calculate the preamble message indicator for a desired subband and report back the preamble message indicator to the one of a plurality of access nodes.

10. The system as recited in claim 7, wherein the plurality of access terminals which share one of the plurality of subbands is assigned to at least one of a plurality of OFDM cells, and wherein each cell provides a plurality of data rate control signals corresponding to the plurality of subbands.

11. The system as recited in claim 7, wherein the plurality of preambles further comprises:
a first subband which carries preamble or packet of all OFDM multiuser packet data.

12. The system as recited in claim 7, wherein the plurality of subbands comprises a two-level pilot when both MIMO and OFDM data are transmitted, the two-level pilot comprising:
a common spatial pilot indicating the following transmission or interlace is multiuser or single user; and a dedicated spatial pilot indicating which access terminal to be served.

13. A method for an access terminal which is coupled to a plurality of access nodes, the method comprising:
receiving one of a plurality of subbands which is decided by the plurality of access nodes; communicating with the plurality of access nodes according to one of the plurality of subbands, the plurality of subbands comprising a plurality of preambles, said communicating further comprising time division multiplexing interlaces according to the plurality of subbands and the plurality of preambles, and wherein the plurality of preambles comprises an interlace indication that indicates subband allocation for a next or current interlace; and receiving a two-level indicator denoting whether a following packet is a single-user packet, a multiuser packet, or a multiuser multiplexing pattern, and whether said following packet is served for the access terminal or not, wherein a first signal of the two-level indicator is OFDM modulated, and a second signal of the two-level indicator denotes which access terminal is to be served in a following interlace;

wherein said communicating further comprises receiving a system public data field signal indicating which one of the plurality of subbands are configured to a particular access terminal when the particular access terminal sets up connection with one of the plurality of access nodes, and receiving multi-layer OFDM multi-user packet data.

14. The method as recited in claim 13, the method further comprising receiving single-layer OFDM multi-user packet data.

15. The method as recited in claim 13, wherein when the access terminal shares one of the plurality of subband with other access terminals, the method comprises: receiving OFDM data, the corresponding subband transmitting a multiuser packet with superposition coding; and receiving MIMO data with an antenna, the antenna is determined according to at least one of the following:

beam selection, wherein a beam with strong signal power with a feedback of a preamble message indicator is selected; and subband selection, wherein the access terminal calculates the preamble message indicator for a desired subband and reports back the preamble message indicator to the access node.

16. The method as recited in claim 13, wherein when the access terminal shares one of the plurality of subband with other access terminals and is assigned to at least one of a plurality of ODFM cells, the method further comprises receiving a plurality of data rate control signals corresponding to the plurality of subbands.

17. The method as recited in claim 13, wherein the plurality of preambles further comprises:

a first subband which carries preamble or packet of all OFDM multiuser packet data.

18. The method as recited in claim 13, wherein one of the plurality of subbands further comprises a two-level pilot when the access terminal shares one of the plurality of subbands with other access terminals and receives both of MIMO and OFDM data, the two-level pilot further comprising:

a common spatial pilot indicating the following transmission or interlace is multiuser or single user; and a dedicated spatial pilot indicating which access terminal to be served.

19. A system, comprising:

a plurality of access nodes; and an access terminal, configured to receive one of a plurality of subbands which is decided by the plurality of access nodes, wherein the plurality of subbands comprises a plurality of preambles, wherein the access terminal employs time division multiplexing interlaces according to the plurality of subbands and the plurality of preambles, and wherein the plurality of preambles comprises an interlace indication that indicates subband allocation for a next or current interlace;

wherein the access terminal further receives a two-level indicator denoting whether a following packet is a single-user packet, a multiuser packet, or a multiuser multiplexing pattern, and whether said following packet is served for the access terminal or not, wherein a first signal of the two-level indicator is OFDM modulated, and a second signal of the two-level indicator denotes which access terminal is to be served in a following interlace; and wherein said access terminal receives a system public data field indicating which one of the plurality of subbands are configured to the access terminal when the access terminal sets up connection with the one of the plurality of access nodes, and wherein the access terminal receives multi-layer OFDM multi-user packet data.

20. The system as recited in claim 19, wherein said access terminal further receives single-layer OFDM multi-user packet data.

21. The system as recited in claim 19, wherein when the access terminal shares one of the plurality of subbands with another access terminal, the access terminal receives OFDM data, wherein the corresponding subband transmits a multiuser packet with superposition coding, and wherein the access terminal receives MIMO data with an antenna, wherein the antenna is determined according to at least one of the following:

beam selection, wherein a beam with strong signal power with a feedback of a preamble message indicator is selected; and subband selection, wherein the access terminal calculates the preamble message indicator for a desired subband and reports back the preamble message indicator to the one of a plurality of access nodes.

22. The system as recited in claim 19, wherein when the access terminal shares one of the plurality of subbands with another access terminal and is assigned to at least one of a plurality of ODFM cells, the access terminal receives a plurality of data rate control signals corresponding to the plurality of subbands.

23. The system as recited in claim 19, wherein the plurality of preambles further comprise: a first subband which carries preamble or packet of all OFDM multiuser packet data.

24. The system as recited in claim 19, wherein the plurality of subbands comprises a two-level pilot when the access terminal sharing one of the plurality of subbands with another access terminal and when the access terminal receives both of MIMO and OFDM data, the two-level pilot further comprising:

a common spatial pilot indicating the following transmission or interlace is multiuser or single user; and a dedicated spatial pilot indicating which apparatus to be served.

* * * * *